(12) United States Patent
Bogacz et al.

(10) Patent No.: US 11,062,515 B1
(45) Date of Patent: *Jul. 13, 2021

(54) SYSTEMS AND METHODS FOR STRUCTURED AND CONTROLLED MOVEMENT AND VIEWING WITHIN A POINT CLOUD

(71) Applicant: Illuscio, Inc., Culver City, CA (US)

(72) Inventors: Joseph Bogacz, Perth (CA); Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,945

(22) Filed: Jul. 21, 2020

(51) Int. Cl.
*G06T 19/00* (2011.01)

(52) U.S. Cl.
CPC .................................. *G06T 19/003* (2013.01)

(58) Field of Classification Search
None
See application file for complete search history.

(56) References Cited

U.S. PATENT DOCUMENTS

| | | | | |
|---|---|---|---|---|
| 6,222,557 | B1* | 4/2001 | Pulley, IV | G06T 11/206 345/622 |
| 2007/0052724 | A1* | 3/2007 | Graham | G06T 19/003 345/620 |
| 2009/0100366 | A1* | 4/2009 | Fitzmaurice | G06T 15/20 715/767 |
| 2010/0060648 | A1* | 3/2010 | Carter | A63F 13/12 345/474 |
| 2011/0310088 | A1* | 12/2011 | Adabala | G06T 19/003 345/419 |
| 2012/0092348 | A1* | 4/2012 | McCutchen | G06T 3/00 345/474 |
| 2012/0099804 | A1* | 4/2012 | Aguilera | G06T 19/003 382/285 |
| 2013/0222364 | A1* | 8/2013 | Kraus | G06Q 30/0241 345/419 |

(Continued)

OTHER PUBLICATIONS

Niklas Elmqvist, M. Eduard Tudoreanu, Philippas Tsigas, "Evaluating Motion Constraints for 3D Wayfinding in Immersive and Desktop Virtual Environments", Apr. 10, 2008, ACM, CHI 2008 Proceedings • Finding Your Way, pp. 1769-1778.*

(Continued)

*Primary Examiner* — Robert Bader
(74) *Attorney, Agent, or Firm* — Ansari Katiraei LLP; Arman Katiraei; Sadiq Ansari

(57) ABSTRACT

Provided is a system for structured and controlled movement and viewing within a point cloud. The system may generate or obtain a plurality of data points and one or more waypoints for the point cloud, present a first subset of the plurality of data points in a field-of-view of a camera at an initial position and an initial orientation of a first waypoint, change the camera field-of-view from at least one of (i) the initial position to a modified position within a volume of positions defined by orientation controls of the first waypoint or (ii) the initial orientation to a modified orientation within a range of orientations defined by the orientation controls of the first waypoint, and may present a second subset of the plurality of data points in the camera field-of-view at one or more of the modified position and the modified orientation.

19 Claims, 17 Drawing Sheets

(56) References Cited

U.S. PATENT DOCUMENTS

2014/0044343 A1\* 2/2014 Bell .......................... G06T 5/50
                                                    382/154
2018/0143023 A1\* 5/2018 Bjorke .................. G06T 19/003
2018/0144547 A1\* 5/2018 Shakib .................... G06T 15/60

OTHER PUBLICATIONS

Andrew J. Hanson, Eric A. Wernert, "Constrained 3D Navigation with 2D Controllers", Oct. 24, 1997, IEEE, Proceedings. Visualization '97.\*
Noah Snavely, Steven M. Seitz, Richard Szeliski, "Photo Tourism: Exploring Photo Collections in 3D", Jul. 2006, ACM, SIGGRAPH '06: ACM SIGGRAPH 2006 Papers, pp. 835-846.\*
Nicholas Mario Wardhana, Henry Johan, Hock Soon Seah, "Enhanced waypoint graph for surface and volumetric path planning in virtual worlds", May 3, 2013, Springer, The Visual Computer, vol. 29, pp. 1051-1062.\*

\* cited by examiner

SYSTEMS AND METHODS FOR STRUCTURED AND CONTROLLED MOVEMENT AND VIEWING WITHIN A POINT CLOUD

BACKGROUND

Users may lose spatial awareness or orientation when moving freely within a digitally created three-dimensional ("3D") space. For instance, when viewing a 3D space that has not been structured or curated, a user's point of view may not be appropriate, and the user may become disoriented as a result. Similarly, if the 3D space lacks constraints and structure, the user's freedom of movement will be unhindered, allowing them to pass through seemingly solid objects, causing further confusion. Other attributes, such as the orientation and scale are not established either in an unconstrained and unstructured 3D, preventing the user from seeing the 3D space in its intended context.

DETAILED DESCRIPTION OF PREFERRED EMBODIMENTS

Figure 1:
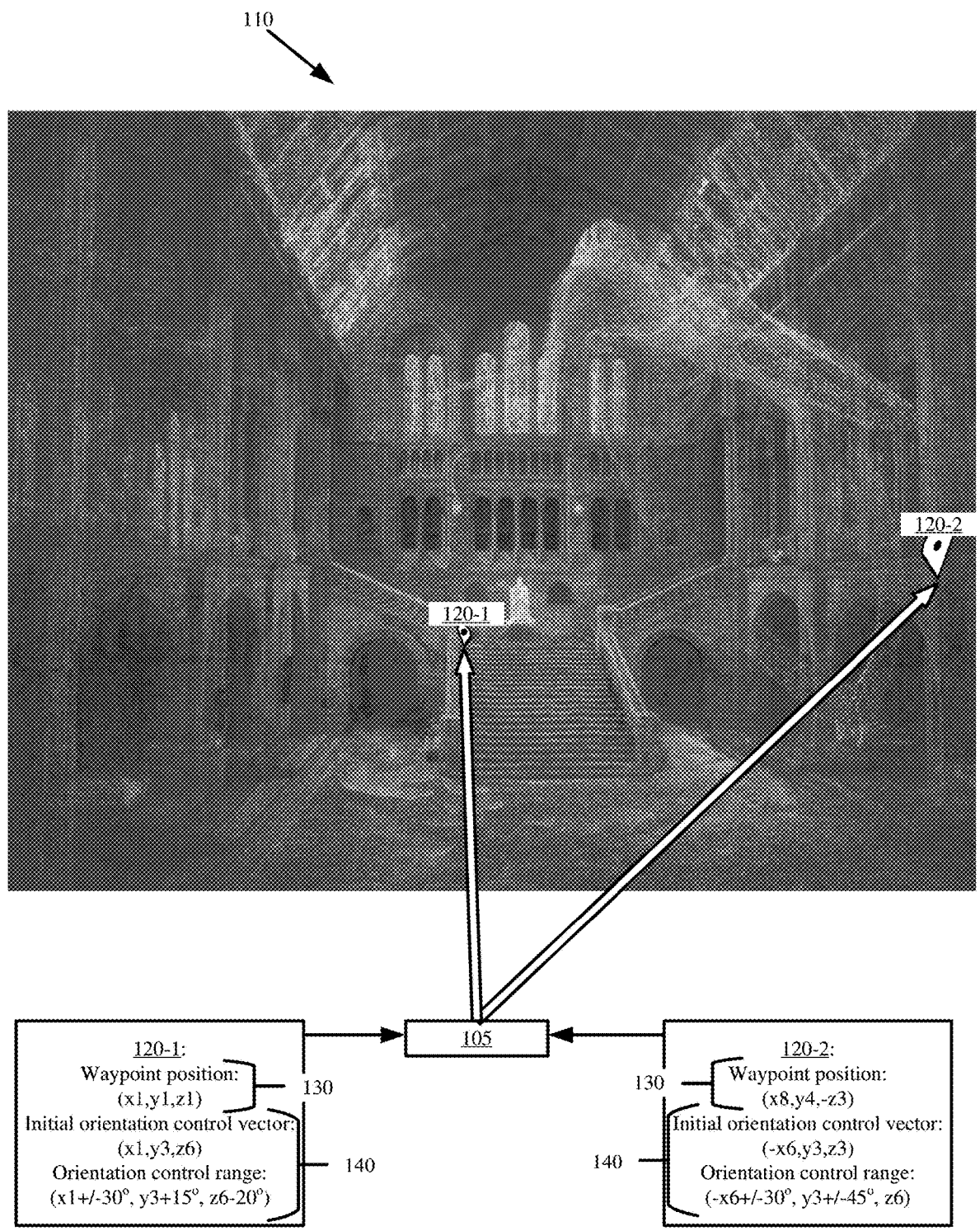
FIG. 1 illustrates an example of point cloud waypoints in accordance with some embodiments presented herein.

The following detailed description refers to the accompanying drawings. The same reference numbers in different drawings may identify the same or similar elements.

A point cloud system may provide structured and controlled movement and viewing within a three-dimensional ("3D") space that is created from a plurality of point cloud data points. The point cloud system, via the structured and controlled movement and viewing, simplifies usage of a point cloud so that users may directly and efficiently access the information that is captured by that point clouds with minimal to no potential of becoming disoriented, getting lost within the point cloud, and/or other difficulties associated with navigating through the plurality of point cloud data points.

To provide the structured and controlled movement and viewing, the point cloud system may provide waypoints within the point cloud. The point cloud system may restrict movements of a camera, that is used to present views in or around the point cloud, to the waypoints or volumes in between the waypoints. The point cloud system may also restrict camera rotations or orientation according to orientation control data elements specified for the waypoints and/or the volumes in between the waypoints. The waypoints may be used to directly and efficiently present features or points of interest in the point cloud to a user without the user becoming disoriented or losing spatial awareness, and to control what the user sees to further prevent disorientation or loss of spatial awareness.

To further provide the structured and controlled movement and viewing, the point cloud system may automatically detect point cloud data points that represent occlusions, obstructions, solids, and/or impassable features within the point cloud, and may prevent movement through or past these data points. The point cloud system may use the automatically detected impassable data points to further control the camera movement, positioning, and/or rotations, and to further control what the user sees. In some embodiments, the point cloud system may use the combination of waypoints and impassable data points to directly focus the camera on a specific feature or point of interest within the point cloud, and to prevent the camera from moving through, past, and/or otherwise losing focus on the specific feature or point of interest.

The point cloud system may include a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for generating the point cloud data points that represent features of an imaged 3D object, volumetric object, or 3D environment. The point cloud system may include one or more processors or devices for processing, manipulating, rendering, and/or performing other point cloud operations disclosed herein. In some embodiments, the point cloud system may include software that runs on the one or more processors or devices to process, manipulate, render, and/or perform other point cloud operations disclosed herein. Accordingly, the point cloud system may include a distributed system with a first component that generates the point cloud data points by imaging a 3D object or 3D environment, and a second component that presents the point cloud on a user device and modifies the presentation in response to user input.

The point cloud data points may differ from pixels of a two-dimensional ("2D") image, because certain regions of the point cloud may have no data points, lower densities of data points, and/or higher densities of data points based on varying amounts of visual information that is detected at those regions when imaging a 3D object, volumetric object, or 3D environment. In contrast, pixels of a 2D image have a uniform density and a fixed arrangement defined by the resolution of the 2D image. Moreover, the point cloud data points may have a non-uniform placement or positioning, whereas the 2D image has pixel data for each pixel of a defined resolution (e.g., 640×480, 800×600, etc.).

Each point cloud data point may include positional and non-positional information. The positional information may include coordinates within 3D space. For instance, each point cloud data point may include x-coordinate, y-coordinate, and z-coordinate data point elements for each imaged feature of the 3D object. The non-positional data point elements may include information about the visual characteristics of the imaged feature. The visual characteristics may correspond to a detected color. The color may be represented using red, green, and blue ("RGB") values. In some embodiments, the visual characteristics may provide the chrominance and/or luminance of the imaged feature. In some other embodiments, the visual characteristics may be related to properties of the imaging device used to capture the object feature at a particular data point. For instance, the visual characteristics may include a Tesla strength value to quantify the strength of the magnetic field that was used in detecting and/or imaging the object part. In some embodiments, the non-positional data elements may include energy, audible or sound, and/or other characteristics of the imaging device or the object being imaged. Accordingly, the non-positional data element can include any property of the imaged object part (e.g., hue, saturation, brightness, reflectivity, etc.) or of the imaging device used to capture the object part at a corresponding data point in 3D space.

Each point cloud data point may include an array of data elements. The array of data elements may provide the positioning of the data point in 3D space as well as one or more visual characteristics of that data point. For instance, a point cloud data point may be stored and/or represented as an array of data elements with some combination of x-coordinate, y-coordinate, z-coordinate, red, green, blue, chrominance, luminance, tesla, and/or other values.

As noted above, the point cloud system may add one or more waypoints within a point cloud, and may use the waypoints to structure and control movement and viewing of the point cloud. FIG. 1 illustrates an example of point cloud waypoints in accordance with some embodiments presented herein.

FIG. 1 illustrates point cloud 110. Point cloud 110 may include a set of data points that represent or that collectively produce the imaged features of a 3D object or environment. Point cloud system 105 may add waypoints 120-1 and 120-2 (sometimes collectively referred to as "waypoints 120" or individually as "waypoint 120") to point cloud 110.

Each waypoint 120 may correspond to a discrete point in point cloud 110. In other words, each waypoint 120 may be defined with x-coordinate, y-coordinate, and z-coordinate positional data elements 130. Each waypoint 120 may have coordinate values that are the same as or different than the coordinate values for a data point of point cloud 110. In other words, a particular data point may be selected as a particular waypoint 120, or a particular waypoint 120 may defined at a position that does not overlap or conflict with a position of any of the set of data points. Point cloud system 105 may use positional data elements 130 to set the camera position at each waypoint 120.

In some embodiments, each waypoint 120 may include orientation control data elements 140 in addition to positional data elements 130. Point cloud system 105 may use orientation control data elements 140 to set the camera orientation and/or other camara properties at each waypoint 120, thereby controlling what is presented to a user from each waypoint 120. More specifically, point cloud system 105 may render and/or display the subset of point cloud data points that fall within the defined position, orientation, and/or other properties for the camera at each waypoint 120.

Orientation control data elements 140 may specify an initial camera position and/or orientation for each waypoint 120. For instance, orientation control data elements 140 for waypoint 120-1 may instruct point cloud system 105 to initially orient a camera at waypoint 120-1 according to a specific directional vector. In some embodiments, orientation control data elements 140 may be specified as angles of rotation in one or more of the x, y, and z axes, or as other values. Orientation control data elements 140 may also configure an initial field-of-view, angle-of-view, and/or other camera or viewing properties.

Figure 2:
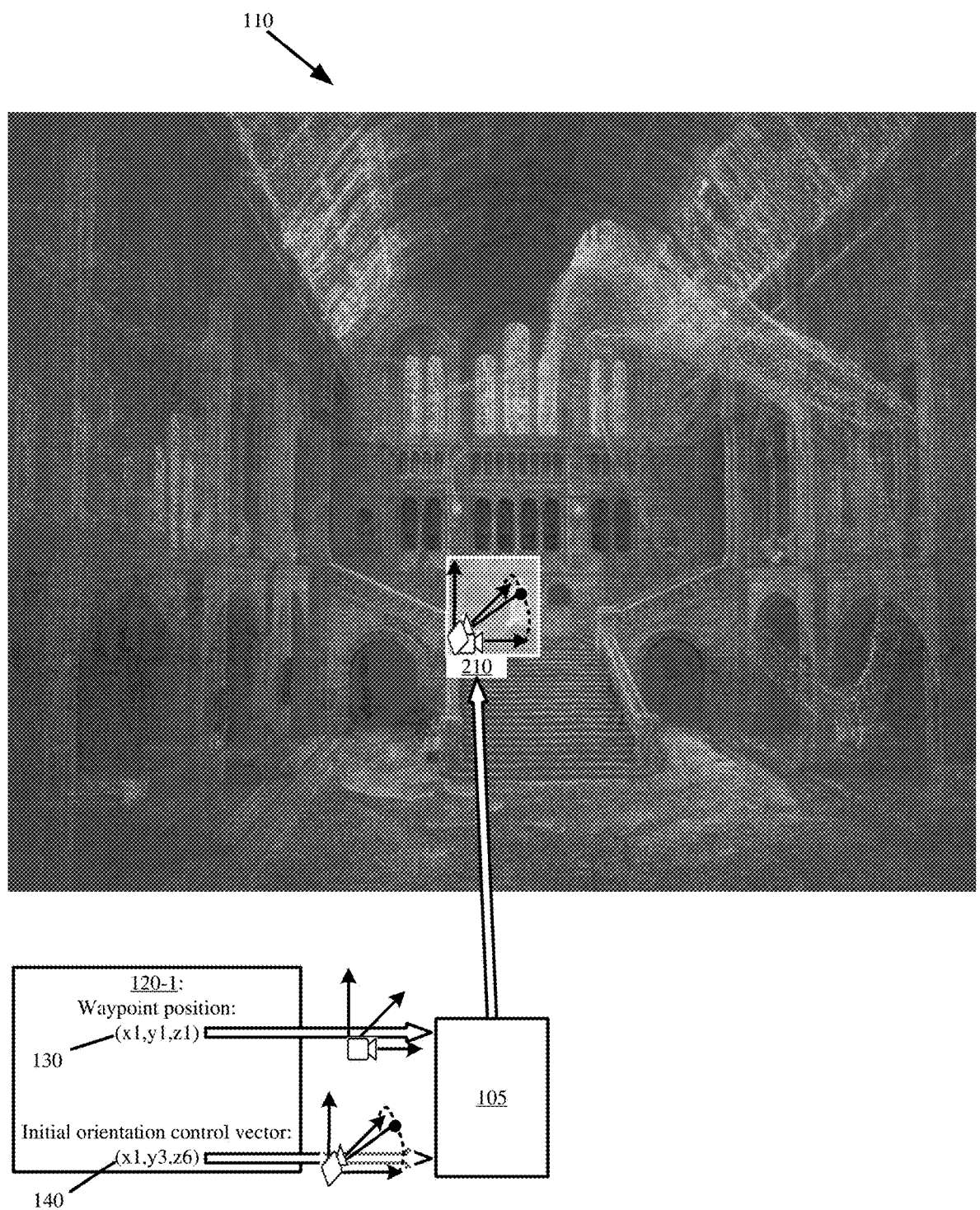
FIG. 2 illustrates an example of a point cloud system setting an initial position and orientation of a camera based on waypoint data elements in accordance with some embodiments.

FIG. 2 illustrates an example of point cloud system 105 setting an initial position and orientation of camera 210 based on data elements of waypoint 120-1 in accordance with some embodiments. Point cloud system 105 may position camera 210 within point cloud 110 based on positional data element 130 of waypoint 120-1. Point cloud system 105 may then set the initial position and orientation of camera 210 based on orientation control data elements 140 of waypoint 120-1.

With reference back to FIG. 1, orientation control data elements 140 may define a permissible range of camera adjustments at each waypoint 120 (e.g., deviations from the initial camera position, orientation, field-of-view, angle-of-view, and/or other camera or viewing properties specified for that waypoint 120). The permissible range of adjustments may provide a user with the ability to customize the viewpoint from each waypoint 120 while still controlling the camera to prevent the user from becoming disoriented or moving the camera off a feature that is of interest at each waypoint 120.

Figure 3:
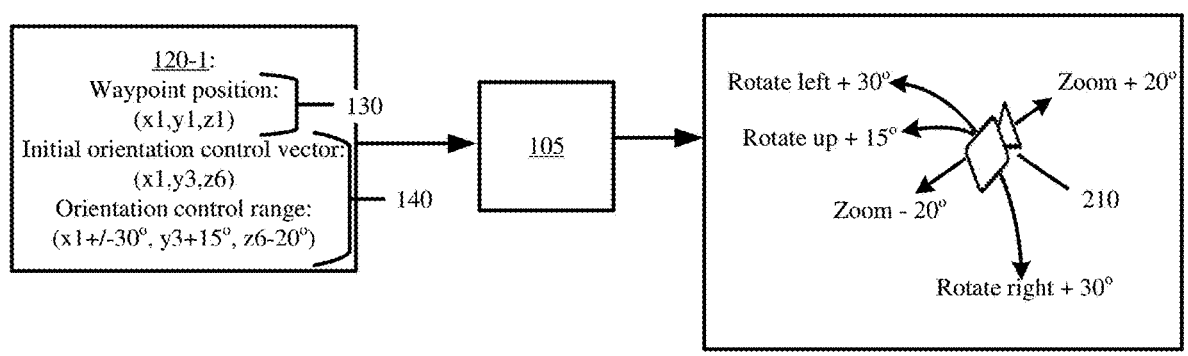
FIG. 3 illustrates an example adjustment range for the camera at a waypoint as defined by the waypoint orientation control data elements in accordance with some embodiments.

FIG. 3 illustrates an example adjustment range for the camera at waypoint 120-1 as defined by orientation control data elements 140 of waypoint 120-1 in accordance with some embodiments. As shown, waypoint 120-1 may include orientation control data elements 140 that permit camera 210 rotation 30 degrees to the right or left (e.g., x+/−30°) from the initial position and orientation defined for camera 210 at waypoint 120-1. Waypoint 120-1 may include orientation control data elements 140 that permit 15 degrees of upward camera 210 rotation (e.g., y3+15°) from the initial position and orientation defined for camera 210 at waypoint 120, and/or zooming in and zooming out by 20 degrees along the z axis (e.g., z6-20°).

By moving directly between waypoints 120, point cloud system 105 may locate and present features, subsets of data points, and/or volumes within point cloud 110 that are of specific interest and located in the initial camera position and/or orientation defined for each waypoint 120. Moreover, point cloud system 105 may use waypoints 120 and each waypoint's 120 orientation control data elements 140 to maintain focus on the feature, subset of data points, and/or specific volume of interest at each waypoint 120, thereby preventing a user from becoming disoriented or inadvertently moving the camera off that feature, subset of data points, and/or specific volume of interest.

For example, the point cloud may represent a manufactured part with a series of welds, and the point cloud waypoints may place the data points that represent the welds holding the part together directly into view. Point cloud system 105 may quickly locate and display the welds by simply jumping to each waypoint. The user can inspect the welds without manually navigating through the point cloud data points and manually identifying the subset of data points that represent each weld. Moreover, point cloud system 105 may restrict camera movement based on the orientation control data elements so that the welds remain in the camera's view at all times, whereas free camera movement at the waypoints or free camera movement to the waypoints may result in point cloud system 105 presenting rendering data points that do not represent some or all of the welds.

Positional data elements 130, orientation control data elements 140, and/or other data for waypoints 120 may be stored in the same point cloud file that stores the point cloud data points. Waypoints 120 may be differentiated from the data points based on the different non-positional data elements (e.g., orientation control data elements 140 of waypoints 120 versus the visual characteristic values of the data points). In some embodiments, waypoints 120 may be differentiated from the data points via the inclusion of a specific bit, tag, or value. In some embodiments, waypoints 120 may be stored apart from the data points. For instance, waypoints 140 may be stored as metadata of point cloud 110, in a separate file from the data points of point cloud 110, or in a database or data structure maintained by point cloud system 105 separate from the point cloud files.

Figure 4A:
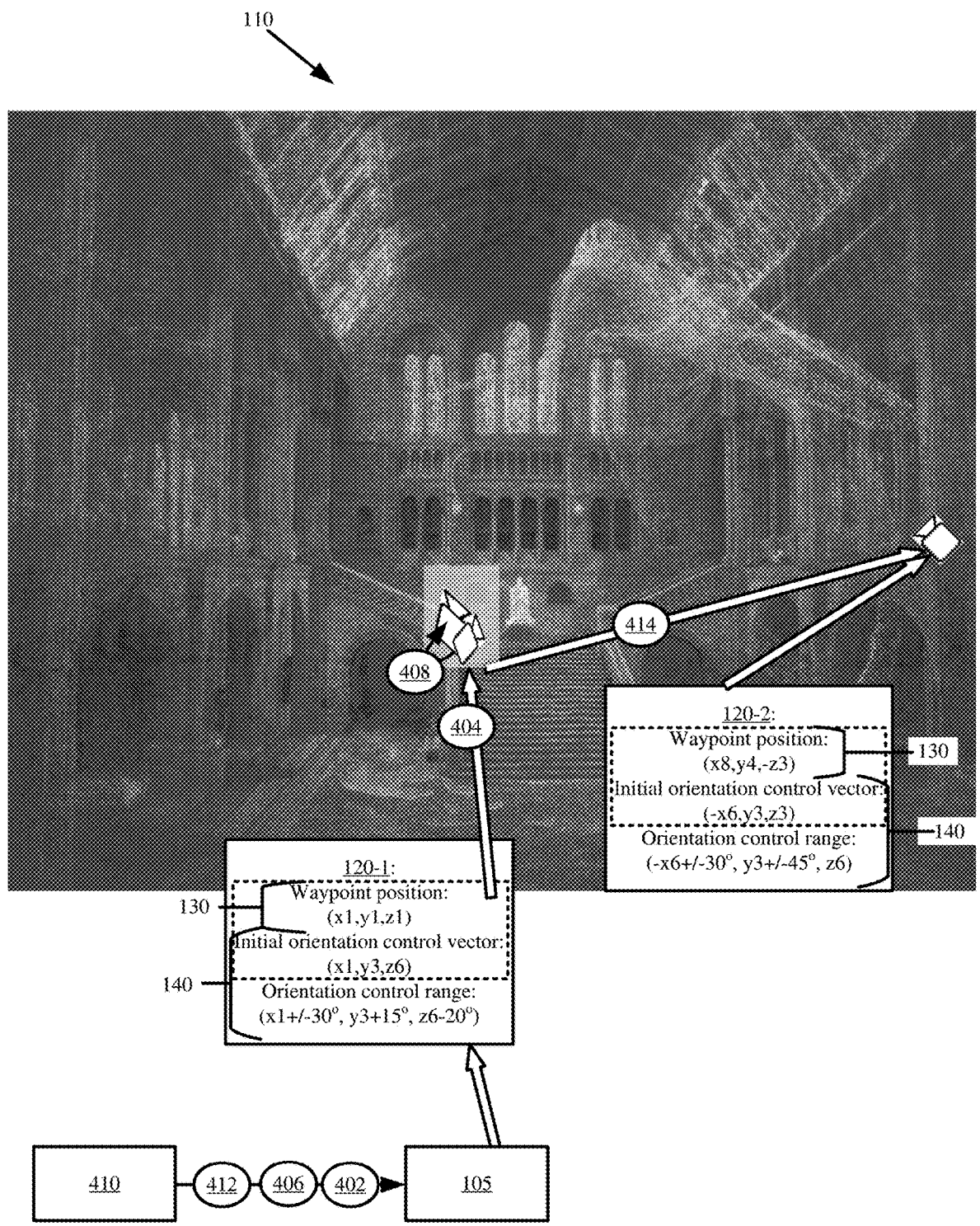
FIGS. 4A, 4B, and 4C illustrate examples of the point cloud system structuring and controlling movement in a point cloud by using waypoints as fixed viewing points in accordance with some embodiments presented herein.
Figure 4B:
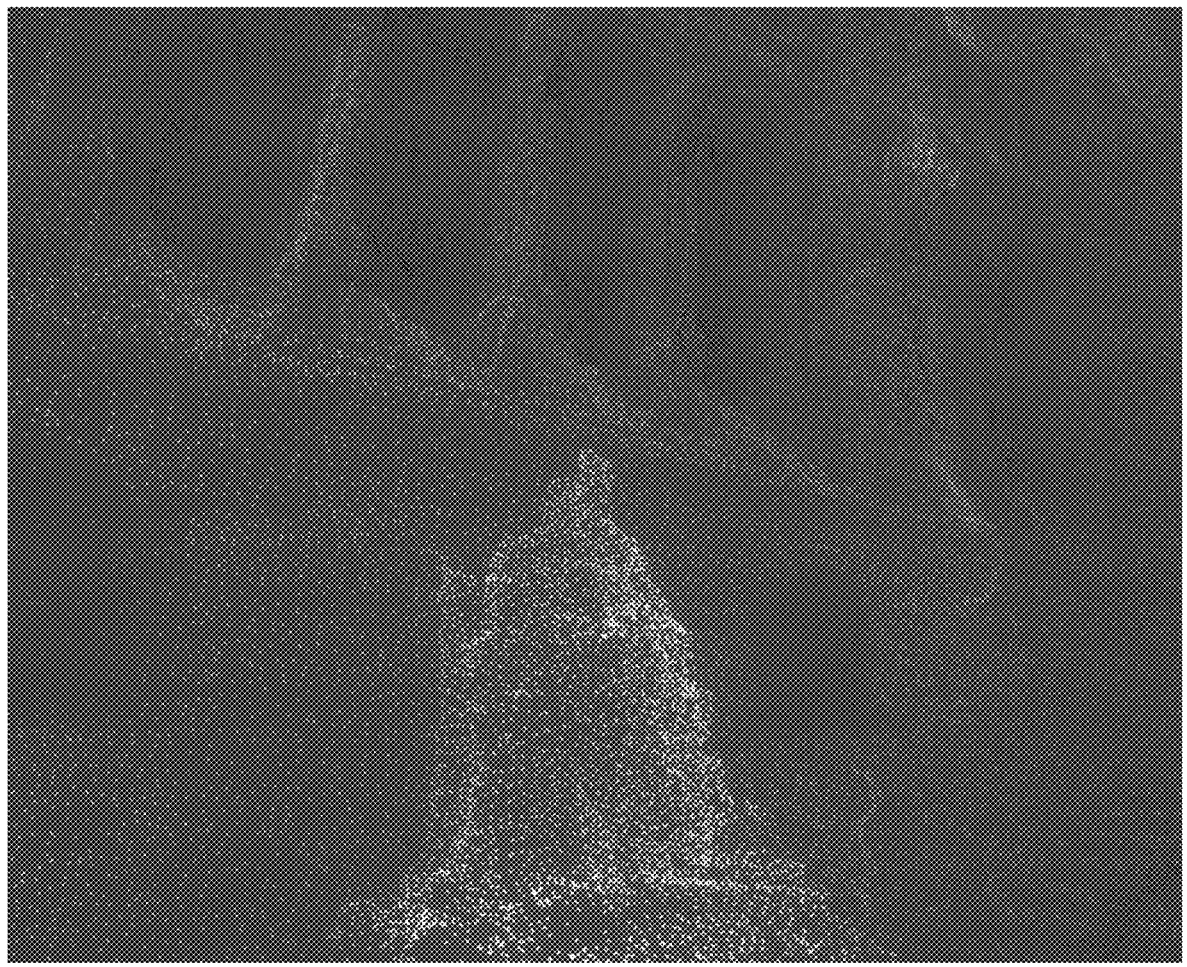
Figure 4C:
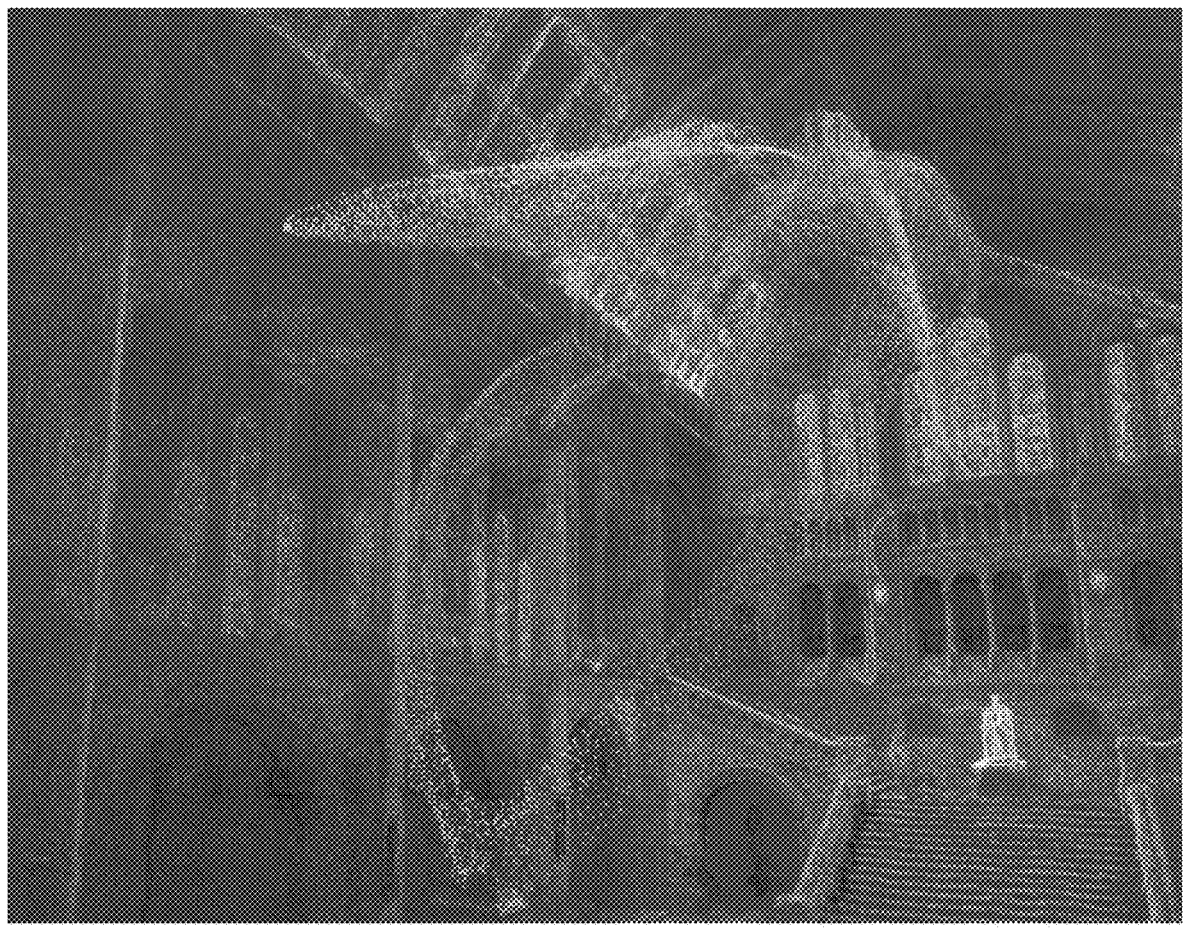

In some embodiments, point cloud system 105 may control movement and viewing of point cloud 110 by implementing waypoints 120 as fixed viewing points. FIGS. 4A, 4B, and 4C illustrate examples of point cloud system 105 structuring and controlling movement in point cloud 110 by using waypoints 120 as fixed viewing points in accordance with some embodiments presented herein.

As shown in FIG. 4A, point cloud system 105 may set waypoint 120-1 as a starting viewing point. Accordingly, when a user or user device 410 requests (at 402) point cloud 110 from point cloud system 105, point cloud system 105 may provide an initial view of point cloud 110 from waypoint 120-1. More specifically, point cloud system 105 may position a camera at waypoint 120-1 according to positional data elements 130 of waypoint 120-1, may orient and/or set other properties of the camera at waypoint 120-1 according to orientation control data elements 140 of waypoint 120-1, and may render the point cloud data points falling within the field-of-view of the camera at the initial position to provide user device 410 with a first presentation of point cloud 110. FIG. 4B illustrates the initial view of point cloud 110 from waypoint 120-1.

Referring back to FIG. 4A, user device 410 may provide (at 406) input for changing the view from waypoint 120-1 by adjusting the orientation, rotation, field-of-view, and/or other properties of the camera. Point cloud system 105 may restrict the adjustments to remain within orientation control data elements 140 of waypoint 120-1, and may provide (at 408) a second presentation of point cloud 110 based on the adjusted camera view.

User device 410 may provide (at 412) input to change the viewing position. In response, point cloud system 105 may change (at 414) the camera position from the position defined by positional data elements 130 of first waypoint 120-1 to the position defined by positional data elements 130 of second waypoint 120-2, and may set an initial orientation and/or other properties for the camera at second waypoint 120-2 according to orientation control data elements 140 of waypoint 120-2. Point cloud system 105 may then generate a third presentation of point cloud 110 based on the initial camera positioning, orientation, and/or other camera properties defined for waypoint 120-2. FIG. 4C illustrates the third presentation of point cloud 110 from the initial viewing position and orientation of waypoint 120-2. Once again, user device 410 may adjust the view so long as the adjustments remain within orientation control data elements of waypoint 120-2.

In some embodiments, point cloud system 105 may move from waypoint 120-1 to waypoint 120-2 in response to input for a next point cloud 110 feature or a rightward progression within point cloud 110 when waypoint 120-2 is defined as the next closest waypoint to the right of waypoint 120-1. Accordingly, point cloud system 105 may change the viewing point or camera position to the next closest waypoint that is in the desired direction of movement. In some other embodiments, users may directly select a next waypoint based on a mapped representation of the waypoints, and point cloud system 105 may directly move the camera to the position of the user selected waypoint. In some embodiments, point cloud system 105 may follow a defined path across waypoints 120.

By using waypoints 120 as fixed viewpoints, point cloud system 105 or the point cloud creator may specifically control how point cloud 110 is viewed and what parts of point cloud 110 are viewable. In some embodiments, point cloud system 105 may control movement and viewing of point cloud 110 by providing a range of free movement between waypoints 120.

Figure 5:
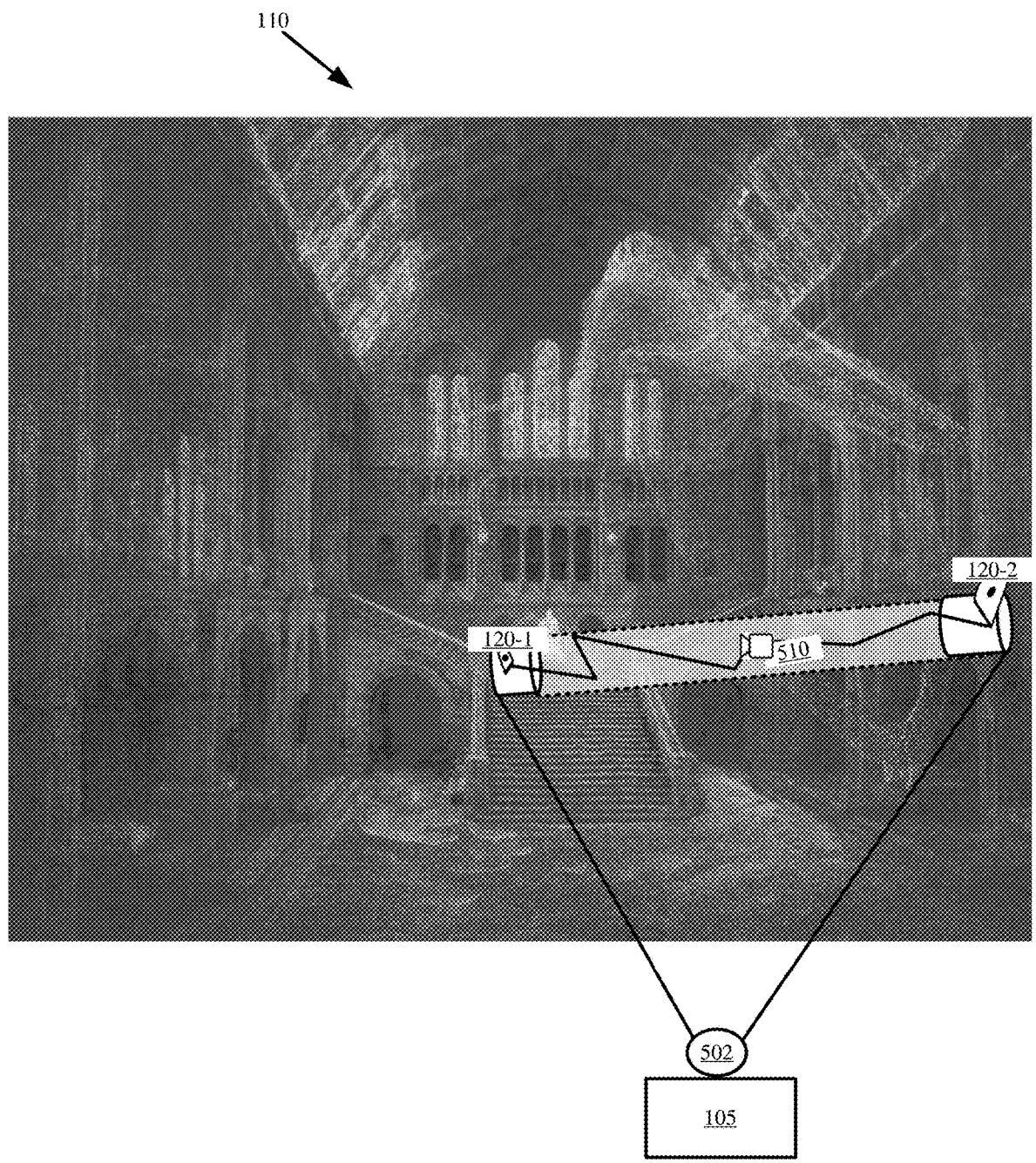
FIG. 5 illustrates an example of the point cloud system providing a range of free movement between two waypoints in accordance with some embodiments presented herein.

FIG. 5 illustrates an example of point cloud system 105 providing a range of free movement between waypoints 120 in accordance with some embodiments presented herein. As shown in FIG. 5, point cloud system 105 may provide (at 502) structured and controlled movement of the camera between waypoints 120-1 and 120-2 via path or volume 510.

Path or volume 510 may ensure that user device 410 does not become lost or disoriented when transitioning between waypoints 120-1 and 120-2. In other words, each end of path or volume 510 may terminate at one of endpoints 120-1 and 120-2.

Path or volume 510 may encompass a set of 3D coordinates within point cloud 110. Point cloud system 105 may define volume 510 to pass through empty space between waypoints 120-1 and 120-2 so to prevent the camera from moving through data points, that represent solid features or walls, and to allow the camera to visualize features of point cloud 110 surrounding the volume.

In some embodiments, point cloud system 105 may define path or volume 510 based on orientation control data elements 140 of waypoints 120. In some embodiments, point cloud system may define the orientation control data elements for path or volume 510 according to the least restrictive or more restrictive orientation control data elements 140 of waypoints 120. In some other embodiments, the orientation control data elements for path or volume 510 may be derived or calculated from orientation control data elements 140 of waypoints 120. For instance, the orientation control data elements for path or volume 510 may be the average or weighted average of orientation control data elements 140 for waypoints 120. In this case, the range of adjustment for the camera when moving within volume 510 may change depending on how close the camera is to waypoint 120-1 or waypoint 120-2.

In some embodiments, point cloud system 105 may define the coordinates for path or volume 510 within which the camera may be moved using a formula. The formula may define a spherical, cubical, or other 3D volume for movement of the camera in between waypoints 120.

Figure 6:
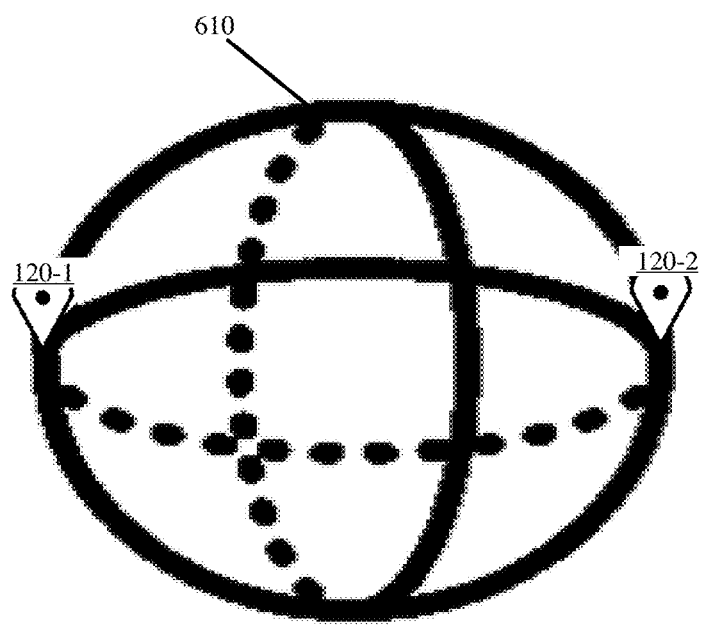
FIG. 6 illustrates an example of the point cloud system generating a spherical volume for structuring and/or controlling movement and viewing between two waypoints in a point cloud in accordance with some embodiments.
Figure 7:
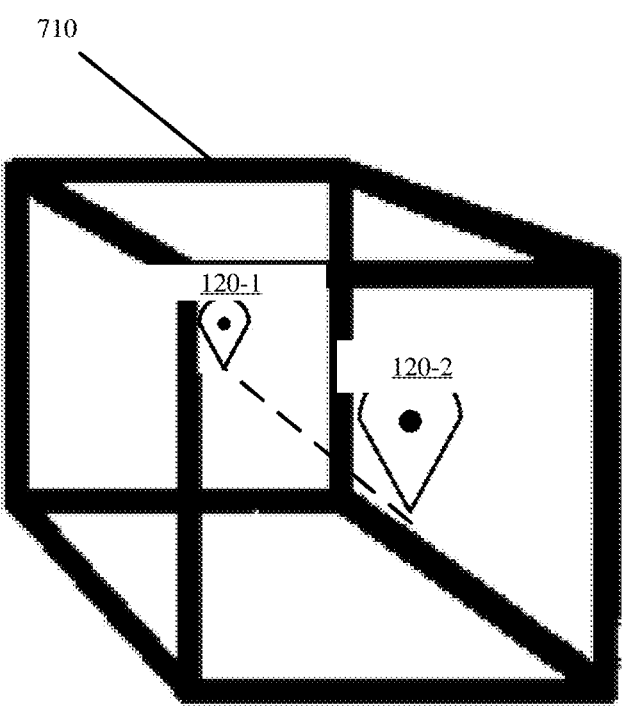
FIG. 7 illustrates an example of the point cloud system providing a cubic volume for structuring and controlling movement and viewing between two waypoints in a point cloud in accordance with some embodiments.

FIG. 5 illustrates cylindrical volume 510 from which point cloud data points in and around volume 510 can be rendered and displayed by the camera as the camera moves through volume 510. FIG. 6 illustrates an example of point cloud system 105 generating (at 602) spherical volume 610 for structuring and/or controlling movement and viewing between waypoints 120-1 and 120-2 in point cloud 110 in accordance with some embodiments. In this example, a user may freely position and/or move the camera anywhere within spherical volume 610 in order view features of point cloud 110 that fall within the camara's field-of-view. As noted above, point cloud system 105 may define orientation control data elements for spherical volume 610 so that the camera orientation camera may be restricted within spherical volume 610 even though the camera positioning within spherical volume 610 is not restricted. For instance, the orientation control data elements may restrict the camera to a downward orientation throughout spherical volume 610 when there is nothing to see above spherical volume 610 or when point cloud 110 restricts presenting the data points above spherical volume 610. FIG. 7 illustrates an example of point cloud system 105 providing cubic volume 710 for structuring and controlling movement and viewing between waypoints 120-1 and 120-2 in point cloud 110 in accordance with some embodiments.

In some embodiments, point cloud system 105 may define an irregular or deformed volume or path between waypoints 120 in order better account for the features of the imaged object and/or the point cloud data points that are positioned between waypoints 120. The irregular or deformed volume or path may be defined to avoid colliding with data points that represent one or more features of the imaged object so that those and other features may be clearly viewed, without camera collision, at any point in the volume or path or when the user moves between waypoints 120.

Figure 8:
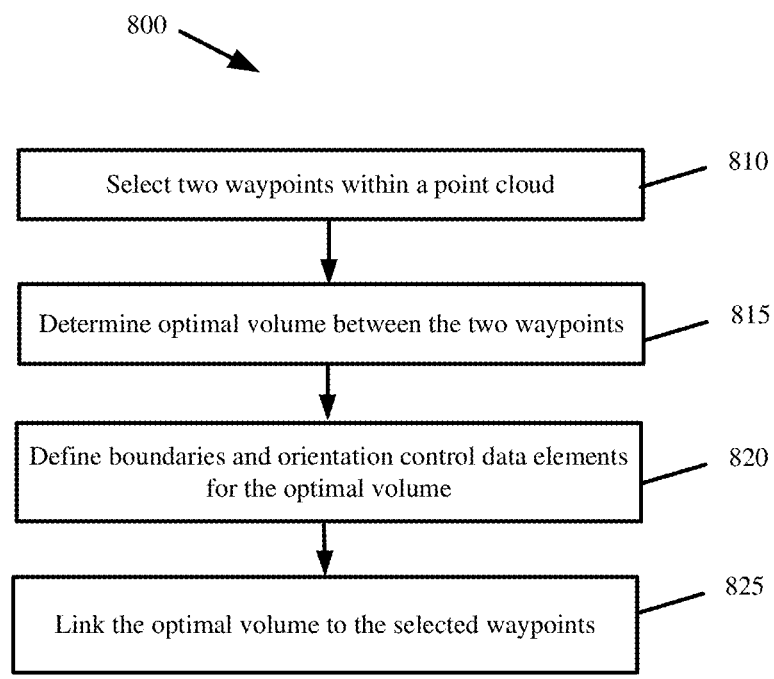
FIG. 8 presents a process for generating an irregular volume or path between multiple waypoints in accordance with some embodiments presented herein.

FIG. 8 presents a process 800 for generating an irregular volume or path between waypoints 120 in accordance with some embodiments presented herein. Process 800 may be implemented by point cloud system 105 for a point cloud with two or more waypoints.

Process 800 may include selecting (at 810) two waypoints within the point cloud. Point cloud system 105 may select (at 810) adjacent waypoints or waypoints that are closest to one another in order to define a volume or path to move between the waypoints. Point cloud system 105 may perform the selection (at 810) to ensure that there is at least one volume or path to each waypoint in a point cloud.

Process 800 may include determining (at 815) an optimal volume between the two waypoints. In some embodiments, point cloud system 105 may search the point cloud for the largest continuous gap between the selected two waypoints, wherein a gap is a region of empty space within the point cloud in which no data points are defined. In some other embodiments, point cloud system 105 may trace different continuous paths, that do not exceed a certain length, between the two waypoints to determine (at 815) the optimal volume.

Process 800 may include defining (at 820) boundaries and orientation control data elements for the optimal volume. Point cloud system 105 may define (at 820) the boundaries for the optimal volume based on the positioning of the data points that closest to the volume periphery. For instance, the positional data elements of the data points closest to the optimal volume periphery may be used to define an irregular shape for the volume or path between waypoints 120. The orientation control data elements for the optimal volume may be defined based on the orientation control data elements for the selected waypoints, and/or the positioning of the data points that are closest to the optimal volume periphery. For instance, point cloud system 105 may define orientation control data elements for the optimal volume that restrict camera orientation to directions in which there are large clusters of data points for viewing or to keep the camera focused on the data points around the optima volume.

Process 800 may include linking (at 825) the optimal volume to each of waypoints 120. For instance, each waypoint 120 may include a pointer to the optimal volume. When receiving input to move the camera between waypoints 120 or away from one of selected waypoints 120, point cloud system 105 may use the pointer to retrieve the optimal volume, and may control camera movement as well as camera orientation, rotation, field-of-view, and/or other camera properties based on the optimal volume definition.

Waypoints 120 may assist novice users from becoming lost or disoriented within the 3D space represented by point cloud 110. Waypoints 120 may also assist advanced users in quickly moving to and viewing a particular point of interest in point cloud 110 without slow and careful movements within point cloud 110.

Nevertheless, users may lose spatial awareness and may become disoriented at a particular waypoint 120 and/or when moving between waypoints 120 as a result of being able to move through data points that represent walls or solids. For instance, point cloud 110 may represent a human heart or the interior of a device. If the user is able to pass from the interior of the heart or device to the exterior or is able to pass through interior walls, the user may quickly lose track of his/her positioning within point cloud 110.

In computer graphics or 3D rendered environments, a programmer may manually define solid walls or objects in the environment. Such manual identification of solids within point cloud 110 may be impractical and unfeasible because point cloud 110 is not generated by a programmer, but is instead generated by imaging equipment that creates the point cloud data points for representing features of an imaged 3D object. Further complicating the identification of solids in point cloud 110 is the fact that a solid, wall, and/or other object captured in point cloud 110 is not represented as a single continuous object that can be marked as a solid. Instead, each solid, wall, and/or other object is represented in point cloud 110 as a cluster of several data points, and each cluster, that represents a single object, may include thousands or millions of discrete or independent data points.

Manual identification of a solid, wall, and/or other object in point cloud 110 would therefore require a user to manually select, amongst the millions of data points in point cloud 110, each data point in a specific cluster of data points that represents that solid, wall, and/or other object. This manner of wall or solid detection is inefficient, error prone, and untenable.

Accordingly, in some embodiments, point cloud system 105 may provide automatic obstacle, wall, or other solid detection within point cloud 110. In particular, point cloud system 105 may automatically detect different data points of point cloud 100 that are solids or objects that cannot be passed through, and may prevent user or camera movement past or through these data points.

In some embodiments, the automatic obstacle, wall, or other solid detection may be based on the one or more non-positional data elements of the data points having values that satisfy one or more thresholds. For instance, a data point with a chrominance, luminance, or reflectivity value that is greater than a threshold value may indicate that the data point corresponds to a point on an imaged solid, wall, or other object. In some embodiments, the creation of a data point in point cloud 100, when imaging a 3D object or 3D environment, may in-and-of-itself indicate a detected solid in the 3D object or 3D environment.

In some cases, the simple detection of a solid point versus empty space may provide insufficient information as to the form of the solid, wall, object feature, etc. For instance, point cloud 110 may include data points that represent multiple objects or multiple features of a single object, and providing a uniform identification of the data points as passable or impassable does not convey any information about the different objects or different features of the object.

Accordingly, point cloud system 105 may automatically detect the subset of data points in point cloud 110 that define different solids, walls, and/or object features in order to automatically detect the shape, form, and/or boundaries of each solid, wall, and/or object feature. By differentiating different sets of impassable data points in point cloud 110, point cloud system 105 may automatically define waypoint 120 placement, orientation control data elements for waypoints 120, and/or volumes for connecting different waypoints 120 so that the different solids, walls, and/or other object features can be presented in their entirety and the camera may be moved without disorienting the user by passing through the solids or by presenting different solids, walls, and/or other object features as one.

In some embodiments, point cloud system 105 may differentiate different subsets of data points that correspond to different solids based on values for one or more non-positional data elements of those data points falling within different thresholds. For instance, an object may have two connected sides. Point cloud system 105 may detect a first set of data points that correspond to the first side and a second set of data points that correspond to the second side based on the first set of data points having a non-positional data element (e.g., lighting, reflectivity, chrominance, luminance, red, green, blue, etc.) with values that are within a first threshold range, and based on the second set of data points having the same non-positional data element with values that are within a different second threshold range.

The automatic detection of solids based on non-positional data element values may be inaccurate when a particular solid has inconsistent values for the non-positional data elements because of inconsistent coloring, different materials or composition, and/or other variance across the solid. Accordingly, point cloud system 105 may perform the autonomous solid detection, or may supplement the automatic solid detection by referencing the data point positional data elements. For instance, point cloud system 105 may scan the data points to identify concentrations and/or clusters of data points that satisfy certain thresholds (e.g., certain number of data points within a specified distance from one another).

In some embodiments, there may be insufficient information within the data point data elements from which to accurately detect distinct features in a point cloud. Accordingly, point cloud system 105 may perform automatic solid detection or may supplement the automatic solid detection with 2D image analysis.

Figure 9:
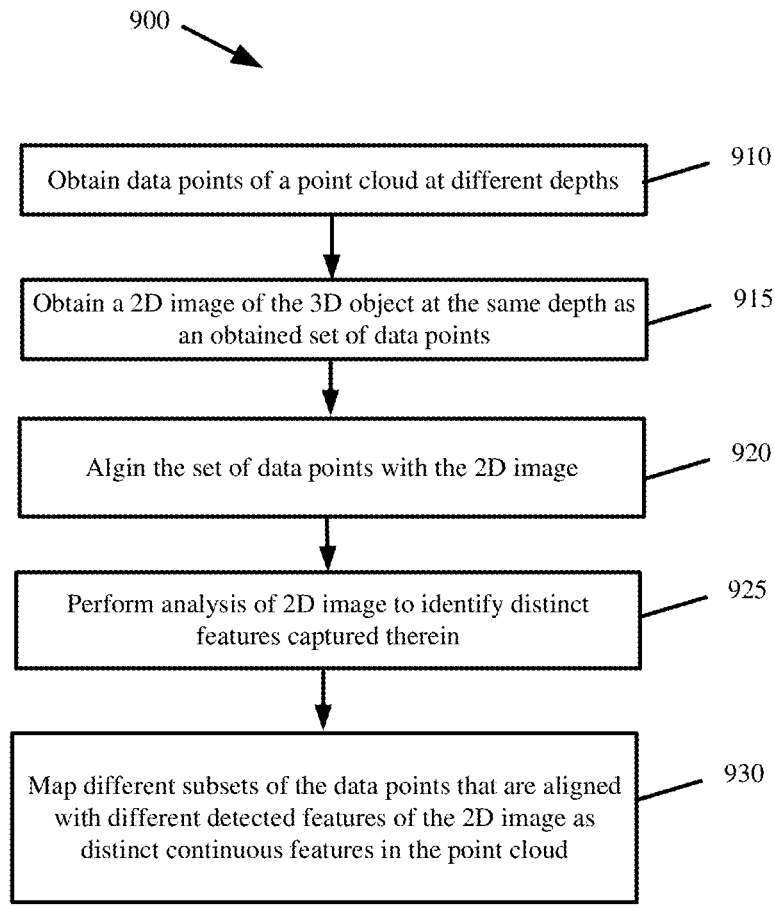
FIG. 9 presents a process for automatic solid detection amongst data points of a point cloud based on 2D image analysis in accordance with some embodiments presented herein.

FIG. 9 presents a process 900 for automatic solid detection amongst data points of a point cloud based on 2D image analysis in accordance with some embodiments presented herein. Process 900 may be performed by point cloud system 105 at the time of point cloud generation or post-processing of a generated point cloud.

Process 900 may include obtaining (at 910) data points of a point cloud at different depths. For instance, the composite point cloud may be formed by imaging features of a 3D object or 3D environment at multiple depths (e.g., different z-axis positioning) and capturing data points for the 3D object features that are visible at each depth. In some embodiments, point cloud system may obtain (at 910) the data points at a particular depth from a point cloud file by selecting the data points that have a particular x-coordinate value, a particular y-coordinate value, or a particular z-coordinate value.

Process 900 may include obtaining (at 915) a 2D image of the 3D object at the same depth as the obtained (at 910) data points. For instance, point cloud system may use a depth sensor and/or structured light imaging device to generate data points for features that are detected at a certain depth or plane of the 3D object, and may use a camera to capture a 2D image of the 3D object at that same depth or plane.

Process 900 may include aligning (at 920) the data points with the 2D image. In particular, the alignment (at 920) may include matching the positioning of data points that represent a particular feature with the positioning of that particular feature in the 2D image. In some embodiments, point cloud system may align (at 920) the data points with the 2D image by correcting for an offset between a first device, that is used to generate the data points, and a second device, that is used to generated the 2D image.

Process 900 may include performing (at 925) an analysis of the 2D image to identify different solids, walls, and/or features that are captured in the 2D image. For instance, point cloud system 105 may perform edge detection to differentiate the features based on their respective edges.

Process 900 may include mapping (at 930) a first subset of the data points that are aligned with a first detected feature of the 2D image as a first continuous feature in the point cloud, and a second subset of the data points that are aligned with a second detected feature of the 2D image as a distinct second continuous feature in the point cloud. The mapping may include grouping or tagging each subset of data points as a distinct feature, wherein the grouping or tagging may include adding a different identifier, that uniquely identifies each distinct feature, to each data of a subset of data points. Consequently, point cloud system 105 may identify all the data points for a particular detected feature based on a set of data point having a common identifier. In some embodiments, point cloud system 105 may supplement the mapping (at 930) by defining the different features based on data points having neighboring positional data and coloring, contrast, brightness, other visual characteristics, and/or other non-visual characteristics (e.g., magnetic field strength values) that are within a threshold range of one another.

Figure 10:
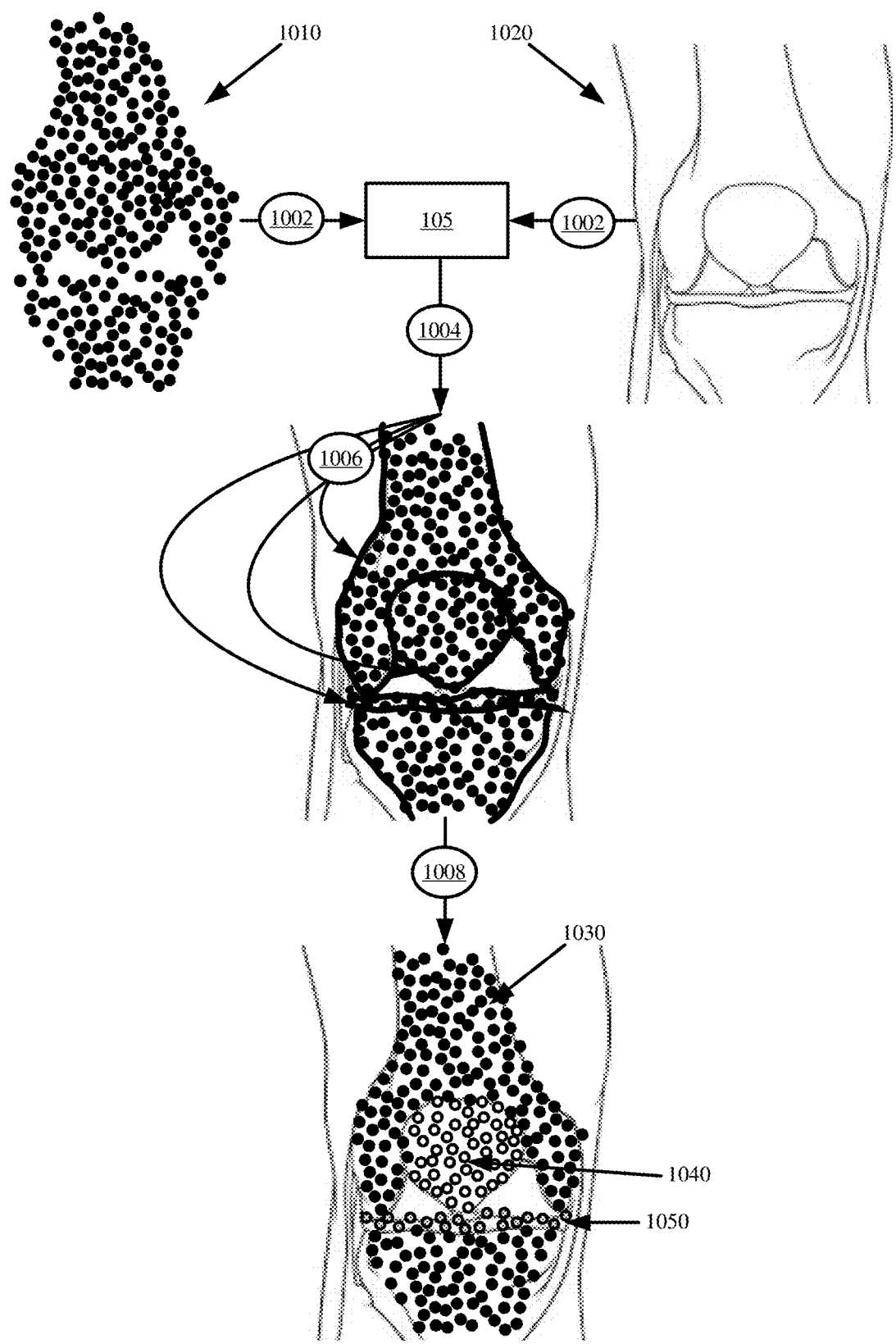
FIG. 10 illustrates an example of the point cloud system automatically detecting data points that correspond to a distinct feature using a 2D image object in accordance with some embodiments presented herein.

FIG. 10 illustrates an example of point cloud system automatically detecting data points that correspond to a distinct feature using a 2D image object in accordance with some embodiments presented herein. FIG. 10 illustrates point cloud system 105 obtaining (at 1002) set of data points 1010 that represent detected features of a 3D object at a particular depth, and 2D image 1020 of the 3D object imaged at the particular depth, wherein 2D image 1020 may be an MRI or CT scan generated image of a patient's knee at the particular depth.

Point cloud system 105 may align (at 1004) set of data points 1010 with 2D image 1020. The alignment (at 1004) may include identifying data point clusters in set of data points 1010 that have a similar formation or positioning as visible features in 2D image 1020.

Point cloud system 105 may detect (at 1006) edges of distinct features in 2D image 1020. The edge detection (at 1006) may include performing an image analysis of 2D image 1020 and/or determining sections in which the image has different coloring and/or other observable delineations. In some embodiments, the edge detection (at 1006) may be supplemented or predicated based on the alignment (at 1004) of set of data points 1010 with 2D image 1020. For instance, if the periphery of a cluster of data points maps to part of 2D image 1020 where there is an observable delineation, then point cloud system 105 may detect an edge of distinct feature.

Point cloud system 105 may tag (at 1008) subsets of data points corresponding to different distinct features with different identifiers. For instance, point cloud system 105 may add a value to differentiate first subset of data points 1030, that fall within detected edges of a first feature, from second subset of data points 1040, that fall within detected edges of a second feature, and from third subset of data points 1050, that fall within detected edges of a third feature.

Figure 11:
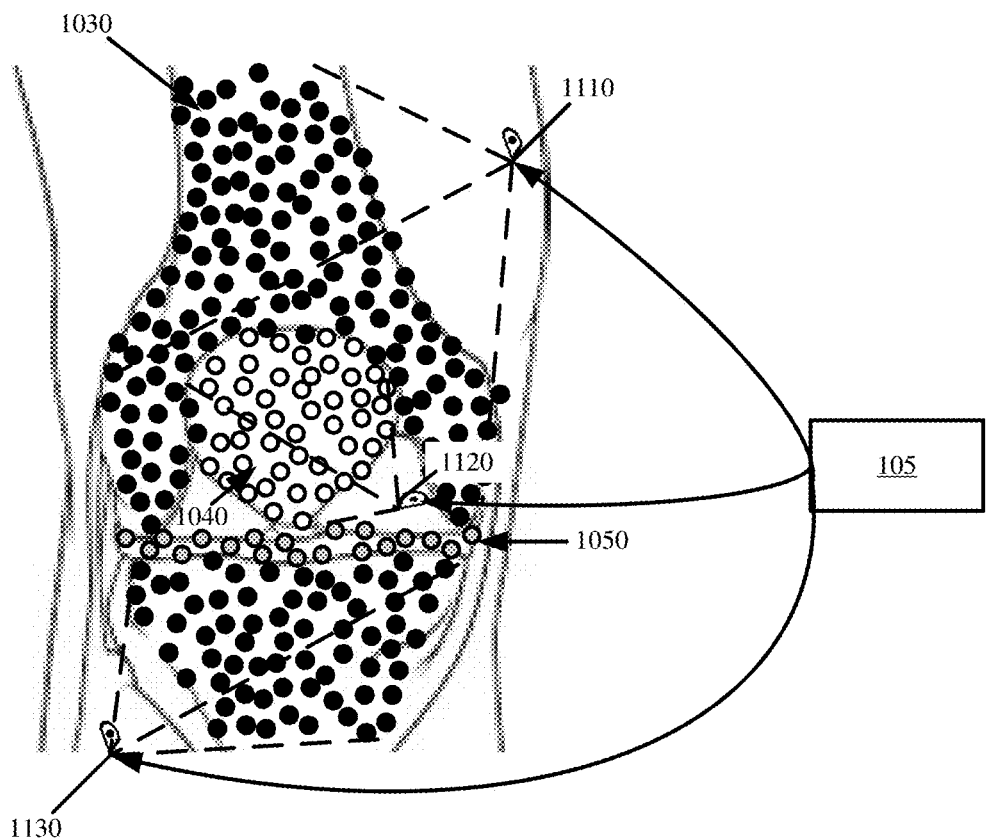
FIG. 11 illustrates an example of the point cloud system automatically defining multiple waypoints based on the mapping of different subsets of data points to distinct features.

Point cloud system 105 may provide structured and controlled movement and viewing of the point cloud based on the differentiation of data points representing different distinct features. For instance, point cloud system 105 may automatically define waypoints 120 based on the automatic detection of the subset of data points that represent different distinct features. FIG. 11 illustrates an example of point cloud system 105 automatically defining waypoints 1110, 1120, and 1130 based on the mapping of subsets of data points 1030, 1040, and 1050 respectively to distinct features that were automatically detected from set of data points 1010 of FIG. 10.

For each waypoint 1110, 1120, and 1130, point cloud system 105 may define camera position and/or orientation control data elements to fully present the distinct feature at that waypoint 1110, 1120, or 1130, and/or to provide camera adjustments for moving around and focusing on that distinct feature. In other words, waypoint 1110 may be defined to prevent a user from moving the camera away from subset of data points 1030 while still permitting the user to zoom into and out of subset of data points 1030 or view subset of data points 1030 from different angles, sides, positions, or views. The initial camera position or positional data elements for waypoint 1110 may be defined at a position that corresponds to empty space in the point cloud or at a position where there are no other data points blocking the camera's view of subset of data points 1030. Accordingly, point cloud system 105 may determine the initial camera position or positional data elements for waypoint 1110 based on the positional data elements of subset of data points 1030 and/or neighboring data points. The structured and controlled movement and viewing may also prevent a user from moving past or through a particular point or feature of interest in the point cloud and/or prevent the user from unexpectedly moving from a feature exterior to the interior or vice versa.

In some embodiments, point cloud system 105 may center the camera on the feature at each waypoint 1110, 1120, and 1130 when the camera is repositioned and the feature is shifted to be away from the center of the camera's field of view. For instance, a user may adjust the camera positioning by zooming in or out from a particular feature that is presented at a particular waypoint. In zooming the camera in or out, the user may change the camera's vertical or horizontal position and/or orientation causing the particular feature to move to the periphery of the camera's field-of-view. In some embodiments, point cloud system 105 may automatically center the particular feature in the camera's field-of-view once the camera movement is complete, thereby retaining focus on the particular feature and assisting the user in viewing the relevant data points of the feature without manually repositioning the camera.

To perform the automatic centering, point cloud system 105 may tag one or more data points at the center of a feature when automatically detecting the data points that form that feature. For instance, process 900 may be enhanced so that the automatic solid and/or feature detection includes identifying a center data point in the subset of data points that are mapped to a detected feature. Point cloud system 105 may identify the center data point from analyzing the positional data elements of the subset of data points. Once the center data point is identified, point cloud system 105 may add metadata or otherwise modify the data elements to designate the center data point as the data point that is at the center of the detected feature.

Point cloud system 105 may then use the center data point for a feature to keep the camera centered or focused on that feature when the default camera position and orientation at the waypoint, that is defined for that feature, is changed. In particular, point cloud system 105 may detect the camera repositioning, detect that the feature remains in the camera's field-of-view, retrieve positional coordinates for the center data point of the feature, and recenter the camera based on the positional coordinates for the center data point of the feature.

One factor that may cause users to lose spatial awareness when viewing a point cloud is the absence of a force returning the user or camera to a normalized position or orientation. For instance, a user is typically permitted to move freely in the 3D space that is represented by a 3D environment or point cloud, and may quickly lose sight of which side is up, down, right, left, etc.

Accordingly, point cloud system 105 may implement a normalization force as part of the structured and controlled movement and viewing of a point cloud. The normalization force may automatically adjust the camera in a specified manner that allows the user to regain his/her bearings.

In some embodiments, the normalization force may return the user and/or camera to a normalized viewing position (e.g., move the camera position) after a period of no camera movement or adjustment or in response to user input to return to the normalized viewing position. In particular, the normalization force may return the camera back to a default plane (e.g., adjust one or more of the x-coordinate, y-coordinate, or z-coordinate values of the camera), but may not may not reorient the camera.

In some embodiments, the normalization force may reorient a camera (e.g., retain the camera position in 3D space but alter the field-of-view) after a duration in which there is no movement or in response to user input. In particular, the normalization force may reorient, tilt, or change the angle of the camera back towards a fixed directional vector, but may not reposition the camera (e.g., alter positional coordinates).

Figure 12:
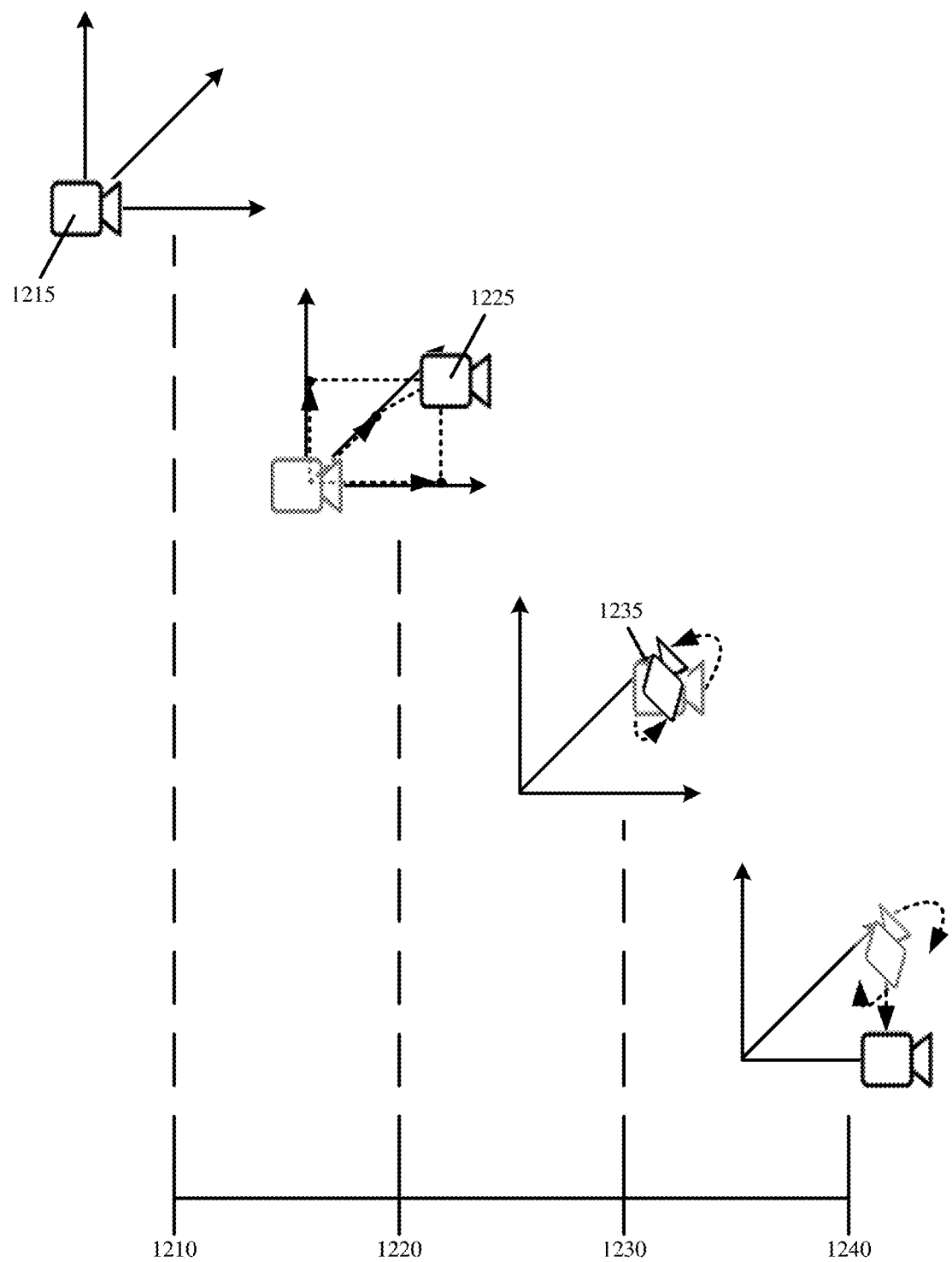
FIG. 12 illustrates an example of the point cloud system applying a normalization force to structure and control movement and viewing of a point cloud in accordance with some embodiments presented herein.

In some embodiments, the normalization force may reposition, reorient, and/or perform other adjustments to the camera after a duration in which there is no movement or in response to user input. FIG. 12 illustrates an example of point cloud system 105 applying a normalization force to structure and control movement and viewing of a point cloud in accordance with some embodiments presented herein.

At first time 1210, point cloud system 105 may initially present a point cloud from a first waypoint, and may provide the camera a first position and orientation that corresponds to normalized camera position and orientation 1215. Between first time 1210 and second time 1220, a user may provide input to move the camera away from the first position to second position 1225 (e.g., a position within a permitted volume of camera movement between the first waypoint and a second waypoint of the point cloud). Between second time 1220 and third time 1230, the user may rotate or change the orientation of the camera from the first orientation to second orientation 1235.

Between third time 1230 and fourth time 1240, there may be no movement or adjustment of the camera, or the user may provide input to return the camera to the normalized position. Consequently, at fourth time 1240, point cloud system 105 may apply the normalization force to the modified second position 1225 and second orientation 1235 of the camera.

The normalization force may return the camera orientation back to the first orientation, and may return the camera position back to the plane of the first camera position (e.g., changes the camera's y-coordinate position without changing the x-coordinate or z-coordinate position of the camera) associated with normalized camera position and orientation 1215. In this example, the normalized position may correspond to a ground surface, and the normalized orientation may correspond to a forward-facing position. Specifically, if the user moved the camera off the ground surface by 10 units, rotated the camera focal point 50 degree upwards, and rotated the camera focal point 25 degrees to the right, point cloud system 105 may return the camera to the normalized position and orientation by gradually reducing the camera position by 10 units, performing a 50 degree downward rotation, and performing a 25 degree leftward rotation to counteract the user's adjustments.

Figure 13:
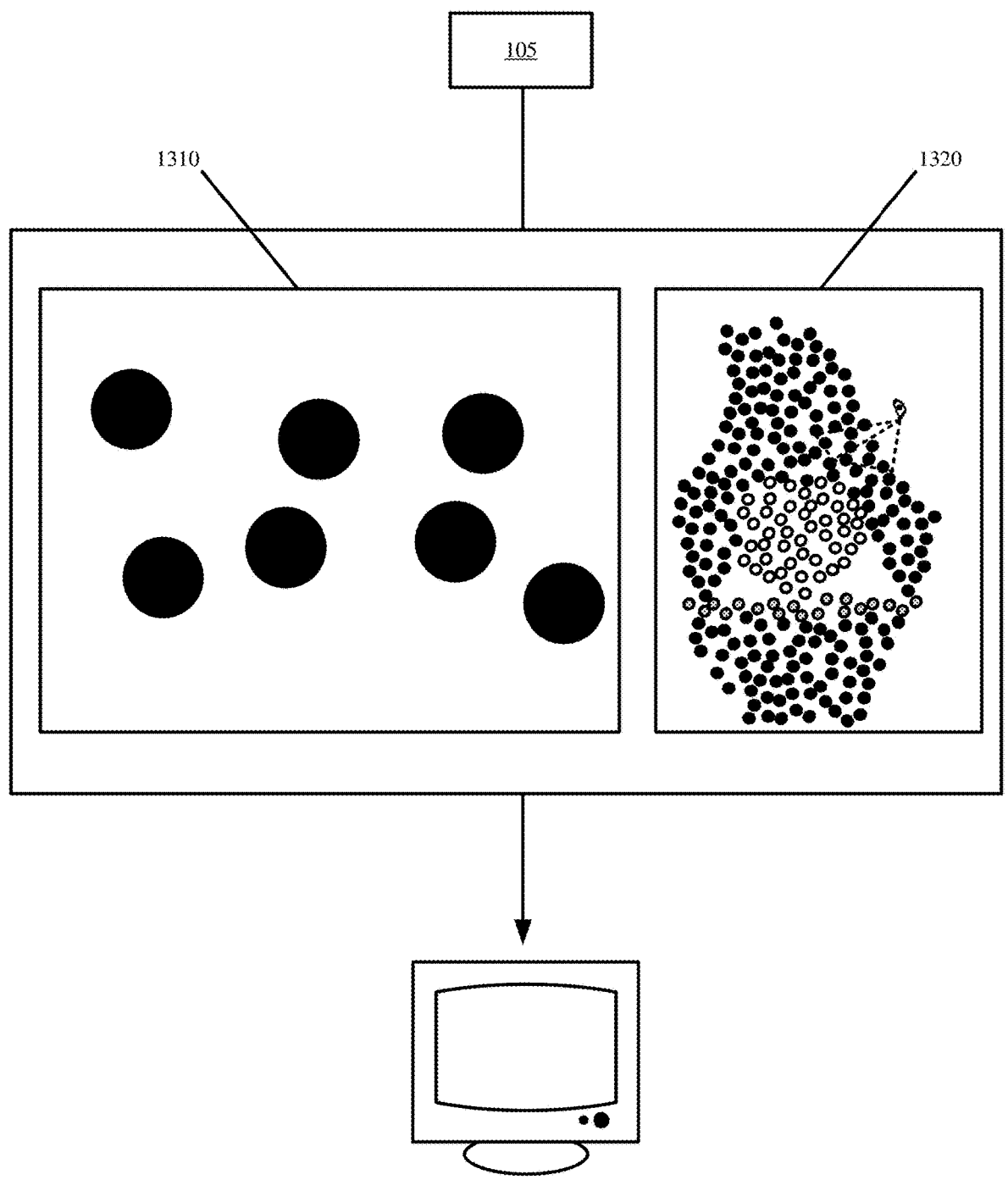
FIG. 13 illustrates an example of the point cloud system providing multiple views for positioning within a point cloud to assist with spatial awareness in accordance with some embodiments presented herein.

Point cloud system 105 may also provide visual aids that assist with spatial awareness. FIG. 13 illustrates an example of point cloud system 105 providing multiple views 1310 and 1320 for positioning within a point cloud to assist with spatial awareness in accordance with some embodiments presented herein.

As shown in FIG. 13, point cloud system 105 may provide first view 1310 that renders the field-of-view from a camera with a specific position and orientation in the point cloud. Point cloud system 105 may also provide second view 1320 that provides a zoomed-out view of the point cloud, and an indicator 1330 that identifies the camera position and/or orientation within the point cloud.

Point cloud system 105 may use one or more of the waypoints, waypoint orientation control data elements, determined paths or volumes between waypoints, automatic solid detection, automatic waypoint definitions, normalization force, and/or multiple views to structure and control movement within a point cloud and viewing of the point cloud. The structured and controlled movement and viewing provided by point cloud system 105 may allow for reproducible efficient and direct movement to particular features or points of interest in the point cloud without potential of a user becoming disoriented or losing spatial awareness. Moreover, the structured and controlled movement and viewing provided by point cloud system 105 may simplify point cloud usage by allowing users to examine and glean information from the features at the points of interest without having the technical expertise to navigate within a point cloud. Accordingly, medical practitioners and scientists may be able to diagnose internal issues (e.g., cancer, inflammation, viruses, infections, etc.) by inspecting point cloud images of the affected organs, tissues, or other body parts without having proficiency in navigating through the point cloud.

Point cloud system 105 may also use one or more of the waypoints to improve rendering and/or processing time of a point cloud. For instance, a point cloud may have millions or billions of data points that can be rendered. Point cloud system 105 may determine which point cloud data points to render based on the camera location at a particular waypoint. For instance, rather than retrieve and display all point cloud data points, point cloud system 105 may selectively retrieve, render, and/or process the point cloud data points that fall within the camera field-of-view at the particular waypoint.

Figure 14:
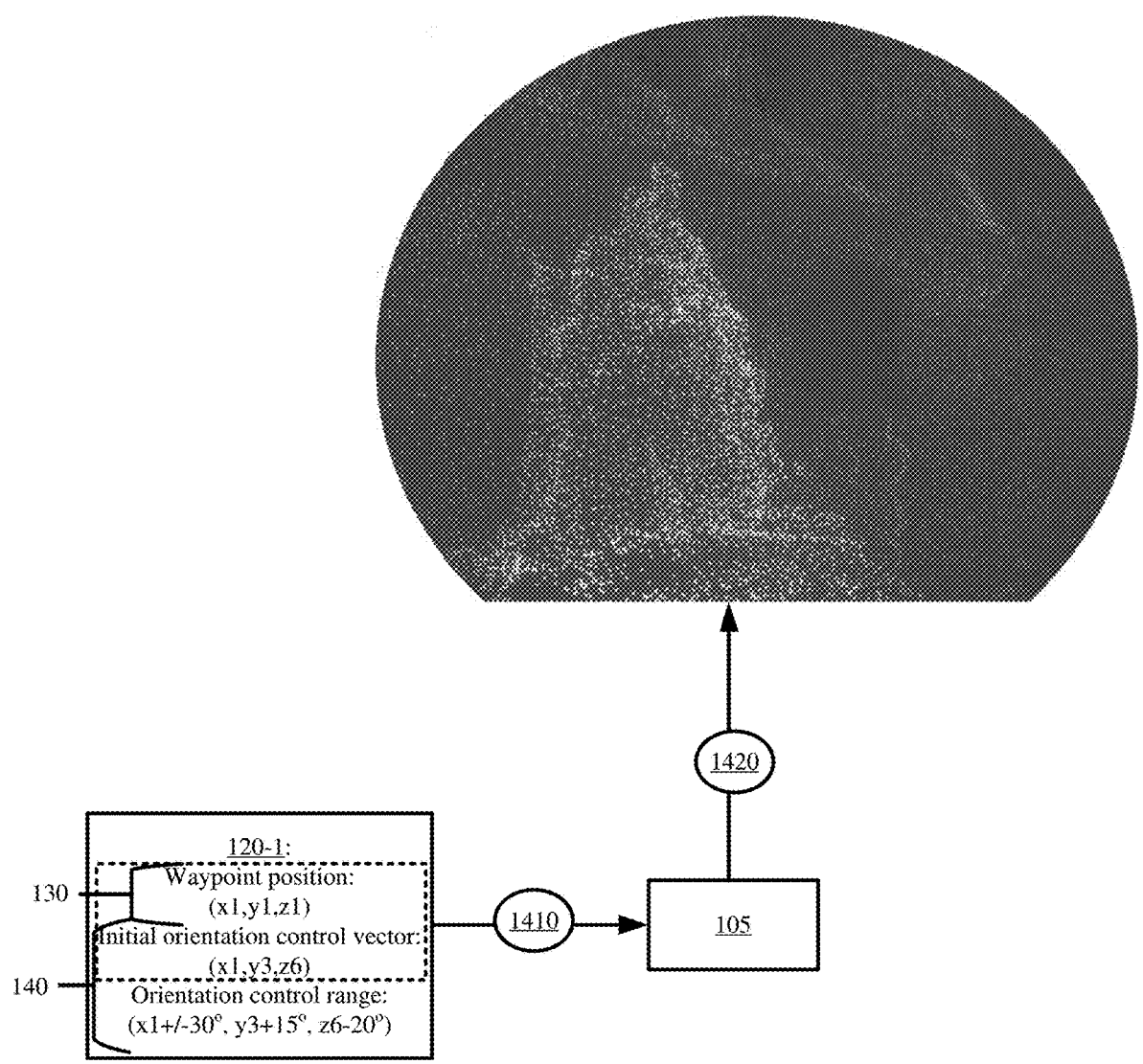
FIG. 14 illustrates selective rendering of data points by the point cloud system in accordance with some embodiments.

FIG. 14 illustrates the selective rendering of data points by point cloud system 105 in accordance with some embodiments. Point cloud system 105 may receive (at 1410) input that positions the camera at waypoint 120-1. In response, point cloud system 105 may determine positional data elements 130 and orientation control data elements 140 for the camera at waypoint 120-1, may determine the camera initial field-of-view and/or permitted field-of-view at waypoint 120-1 based on positional data elements 130 and orientation control data elements 140, and may selectively retrieve, render, and/or process (at 1420) the point cloud data points that fall within the initial field-of-view, the permitted field-of-view, or a custom 3D region that is defined based on the orientation control data elements and positional data elements. Other data points may be retrieved or loaded in at a later time, thereby prioritizing memory and processing resources of point cloud system 105 to display the subset of data points of most relevance at waypoint 120-1.

In some embodiments, point cloud system 105 may simplify the retrieval of the initial set of data points at waypoint 120-1 by tagging or preselecting data points that are initially retrieved at each waypoint. For instance, point cloud system 105 may initially retrieve, render, and/or process a subset of data points with data elements placing the data points within a cubic volume, spherical volume, or other defined volume around a waypoint.

In some embodiments, the number of data points that fall within the defined volume or camera field-of-view at a particular waypoint may still be too numerous to facilitate fast viewing. For instance, point cloud system 105 may retrieve the data points over a data network, and the data network may limit the number of data points that can be loaded in every second as compared to directly loading the data points from local storage or memory.

Figure 15:
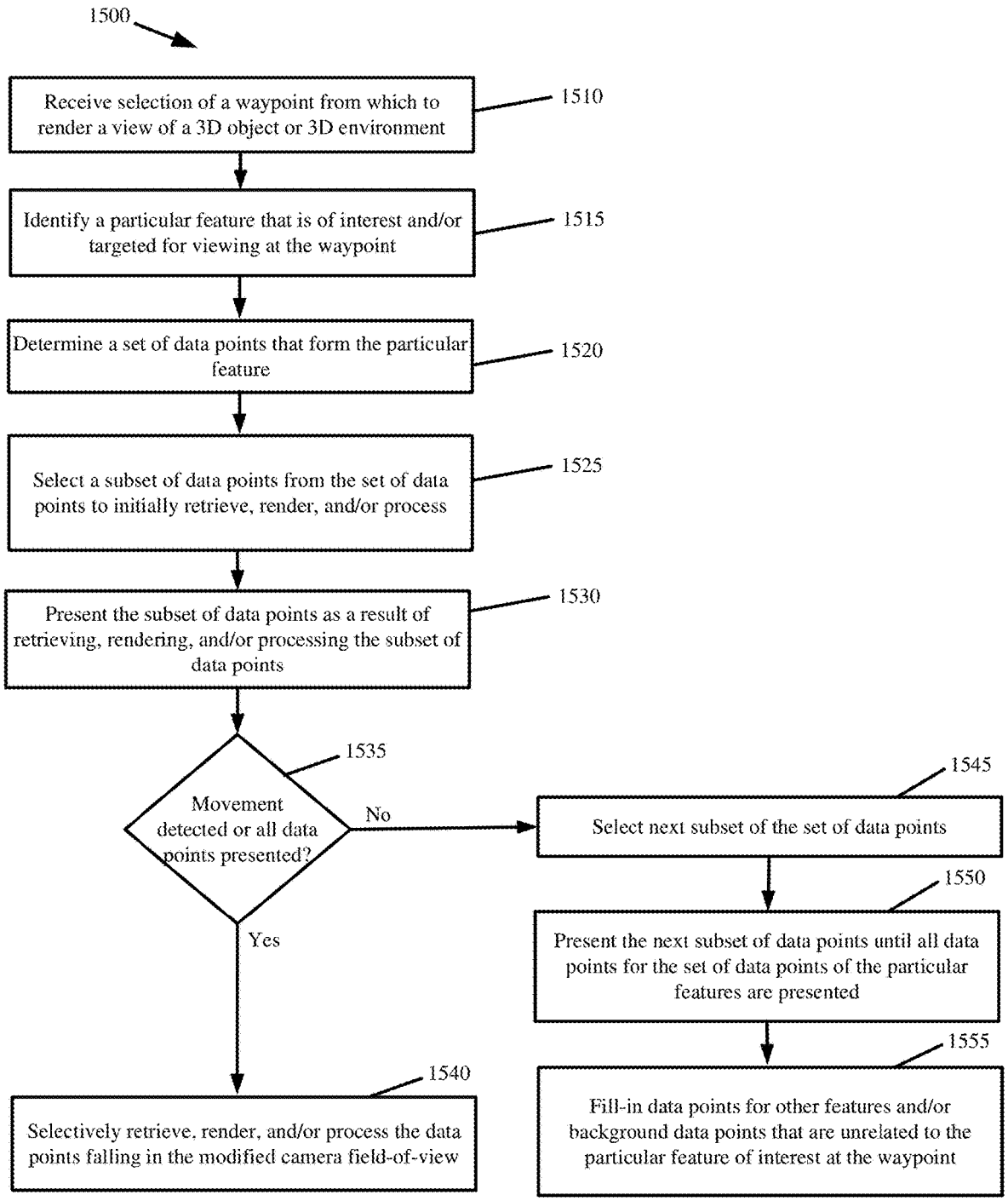
FIG. 15 presents a process for performing a layered filling in of data points in accordance with some embodiments presented herein.

In some such embodiments, point cloud system 105 may perform a layered filling in of data points. FIG. 15 presents a process 1500 for performing a layered filling in of data points in accordance with some embodiments presented herein. Process 1500 may be performed by point cloud system 105 when accessing a large point cloud file or when resources for accessing a point cloud file are limited (e.g., insufficient network bandwidth to retrieve, render, and/or process more than a certain subset of data points every second).

Process 1500 may include receiving (at 1510) selection of a waypoint from which to render a view of a 3D object or 3D environment. Point cloud system 105 may default to the waypoint upon opening a point cloud file, may receive user input that moves the camera to the waypoint, and/or may automatically reposition the camera at the waypoint in response to certain conditions or passage of time.

Process 1500 may include identifying (at 1515) a particular feature that is of interest and/or targeted for viewing at the waypoint. For instance, the waypoint may be defined to present data points for the particular feature, but other data points for irrelevant features or background data points may also fall within the camera's field-of-view when positioned and orientated at the waypoint.

Process 1500 may include determining (at 1520) a set of data points that form the particular feature. Determining (at 1520) the set of data points that form the particular feature may be performed using any of the aforementioned techniques for automatic solid detection and/or automatic detection of data points that correspond to a distinct feature.

Process 1500 may include selecting (at 1525) a subset of data points from the set of data points to initially retrieve, render, and/or process. The selection (at 1525) may include selecting every Nth data point from the set of data points to initially retrieve, render, and/or process. Alternatively, the selection (at 1525) may include initially retrieving, rendering, and/or processing a subset of data points that present the particular feature with the fewest number of data points. For example, the selection (at 1525) may include initially retrieving, rendering, and/or processing the subset of data points that form the outline or edges of the particular feature. As another example, the selection (at 1525) may include identifying dense concentrations within the data points that form the particular feature (e.g., greatest number of data points in a defined region of 3D space), and initially retrieving, rendering, and/or processing a sampling of data points from each of the identified dense concentrations.

Process 1500 may include presenting (at 1530) the subset of data points as a result of retrieving, rendering, and/or processing the subset of data points. Presenting (at 1530) the subset of data points may include positioning and/or orientating the camera according to the positional data elements and orientation control data elements that are defined for the selected waypoint, and displaying the subset of data points that fall within the camera field-of-view at a first time.

Process 1500 may include determining (at 1535) whether the camera has been repositioned. In response to determining (at 1535—Yes) that there is camera movement, process 1500 may include restarting process 1500 and/or selectively retrieving, rendering, and/or processing (at 1540) data points falling in the modified camera field-of-view. In response to determining (at 1535—No) that there is no camera movement, process 1500 may continue filling-in the rendered scene by selecting (at 1545) a next subset of the set of data points, presenting (at 1550) the next subset of data points until all data points for the set of data points of the particular features are presented. Once the set of data points for the particular feature are presented, process 1500 may begin filling-in (at 1545) data points for other features and/or background data points that are unrelated to the particular feature of interest at the waypoint.

Figure 16:
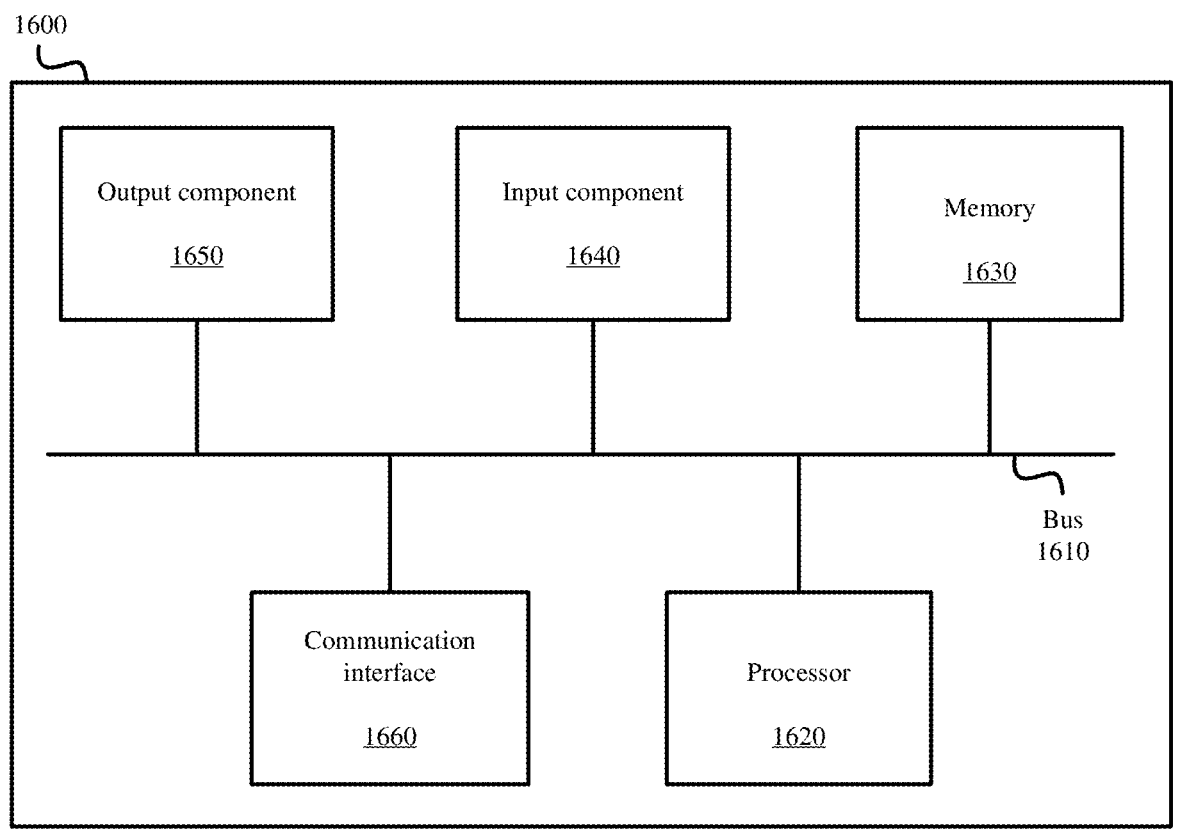
FIG. 16 illustrates example components of one or more devices, according to one or more embodiments described herein.

FIG. 16 is a diagram of example components of device 1600. Device 1600 may be used to implement one or more of the devices or systems described above (e.g., point cloud system 105). Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    obtaining a point cloud comprising (i) a first plurality of data points that collectively produce a three-dimensional ("3D") image of an object with a plurality of features, and (ii) a second plurality of data points that are interspersed amongst the first plurality of data points as one or more waypoints that control viewing of the first plurality of data points,
        wherein each data point of the first plurality of data points comprises a set of elements with values that define a position of the data point in 3D space of the point cloud and visual characteristics of the data point, and
        wherein each data point of the second plurality of data points comprises a position in the 3D space of the point cloud for a different initial camera position, an initial camera orientation at the initial camera position that is linked to and centered on a different data point of the first plurality of data points, and orientation controls limiting camera adjustments from the initial camera position and the initial camera orientation;
    presenting a first subset of the first plurality of data points in a field-of-view of the camera at the initial camera position and the initial camera orientation of a first waypoint of the one or more waypoints;
    changing the camera field-of-view from at least one of (i) the initial camera position to a modified camera position within a volume of positions defined by the orientation controls of the first waypoint, or (ii) the initial camera orientation to a modified camera orientation within a range of camera orientations defined by the orientation controls of the first waypoint;
    receiving input for transitioning from the first waypoint to a second waypoint of the one or more waypoints;
    detecting a volume between the first waypoint and the second waypoint that does not intersect a data point from the first plurality of data points;
    limiting camera adjustments within the volume between the first waypoint and the second waypoint according to volume orientation controls that are derived from (i) the orientation controls of the first waypoint defining a first limited set of camera adjustments at the first waypoint, and (ii) the orientation controls of the second waypoint defining a second limited set of camera adjustments at the second waypoint; and
    presenting different subsets of the first plurality of data points in the field-of-view of the camera constrained by the volume orientation controls as the camera moves through the volume between the first waypoint and the second waypoint.

2. The method of claim 1, wherein the first subset of data points forms a first feature of the plurality of features, the method further comprising:
    presenting a second subset of the first plurality of data points in the field-of-view of the camera at the initial camera position and the initial camera orientation of the second waypoint, wherein the second subset of data points present a second feature of the object that is different than the first feature of the object, and wherein the orientation controls of the second waypoint retain the field-of-view on the second feature and prevent the field-of-view from moving away from the second feature.

3. The method of claim 1,
wherein presenting the different subsets of the first plurality of data points comprises:
    moving the camera along a path of nonlinear positions within the volume while restricting camera orientation within a range of camera orientations defined by the volume orientation controls; and
    preventing movement of the camera outside the volume.

4. The method of claim 1,
wherein presenting the different subsets of data points comprises presenting the different subsets of data points for a first set of features at a first side of the volume, wherein the first side of the volume is in range of the volume orientation controls; and
the method further comprising preventing rotation or orientation of the camera to a different second side of the volume when the camera moves through the volume as a result of the second side being outside the range of the volume orientation controls.

5. The method of claim 1, wherein detecting the volume comprises:
    providing a spherical, cubic, or cylindrical volume between the first waypoint and the second waypoint; and
    repositioning the camera freely within the spherical, cubic, or cylindrical volume.

6. The method of claim 1, wherein detecting the volume comprises:
    detecting, in the point cloud, a non-linear region of empty space between the first waypoint and the second waypoint in which no data points of the first plurality of data points are defined; and
    defining an irregular shape for the volume that encompasses the non-linear region of empty space between the first waypoint and the second waypoint.

7. The method of claim 1 further comprising:
detecting a period of no camera adjustments after said changing; and
repositioning the camera from the modified camera position to a normalized plane in response to said detecting the period of no camera adjustments after said changing, wherein said repositioning comprises modifying one of an x-coordinate, y-coordinate, or z-coordinate of the camera and retaining another of the x-coordinate, y-coordinate, or z-coordinate of the camera.

8. The method of claim 1 further comprising:
detecting a period of no camera adjustments after said changing; and
reorienting the camera from the modified camera orientation to a normalized orientation in response to said detecting the period of no camera adjustments after said changing, wherein said reorienting comprises adjusting orientation of the camera from the modified camera orientation to the initial camera orientation.

9. The method of claim 1 further comprising:
obtaining a two-dimensional ("2D") image of the object;
aligning the first plurality of data points from the point cloud with the 2D image; and
selecting different sets of the first plurality of data points that represent different features of the plurality of features based on said aligning, wherein said selecting comprises selecting the first subset of data points as a set of data points that represent a first feature of the plurality of features.

10. The method of claim 9, wherein said selecting comprises:
    detecting edges for each feature of the plurality of features in the 2D image; and
    mapping a particular set of the first plurality of data points that are aligned within the edges of a particular feature to that particular feature.

11. The method of claim 9 further comprising:
determining a particular position in the 3D space of the point cloud at which the first subset of data points, that form the first feature, fall within the field-of-view of the camera without obstruction by other data points of the first plurality of data points;
determining a particular orientation from the particular position that places the first subset of data points in the field-of-view of the camera; and
configuring the particular position as the initial camera position for the first waypoint, and the particular orientation as the initial camera orientation for the first waypoint.

12. The method of claim 9 further comprising:
defining a different waypoint of the one or more waypoints at which to present each of the different sets of data points, wherein each feature of the plurality of features is mapped to a different waypoint of the one or more waypoints.

13. The method of claim 1 further comprising:
preventing movement of the camera through or past the first subset of data points based on the orientation controls of the first waypoint; and
preventing rotation of the camera away from the first subset of data points based on the orientation controls of the first waypoint.

14. The method of claim 1, wherein limiting the camera adjustments within the volume comprises:
    adjusting the volume orientation controls based on proximity of a position of the camera within the volume to the first waypoint or the second waypoint, wherein said adjusting the volume orientation controls comprises:
        changing the volume orientation controls based on the orientation controls of the first waypoint in response to the position of the camera within the volume being closer to the first waypoint than the second waypoint; and
        changing the volume orientation controls based on the orientation controls of the second waypoint in response to the position of the camera within the volume being closer to the second waypoint than the first waypoint.

15. The method of claim 1, wherein limiting the camera adjustments within the volume comprises:
    setting the volume orientation controls based on an average or weighted average of the orientation controls of the first waypoint and the orientation controls of the second waypoint.

16. The method of claim 1 further comprising:
differentiating a particular set of the first plurality of data points as a solid region within the point cloud from other sets of the first plurality of data points that are not solid regions based on the visual characteristics of the particular set of data points satisfying one or more thresholds and the visual characteristics of the other sets of data points not satisfying the one or more thresholds; and preventing movement of the camera through the solid region represented by the particular set of data points.

17. The method of claim 1 further comprising:

differentiating the first subset of data points from other subsets of the first plurality of data points based on the visual characteristics of the first subset of data points satisfying one or more thresholds and the visual characteristics of the other subsets of data points not satisfying the one or more thresholds;

defining the first subset of data points as a first feature of the plurality of features based on said differentiating; and setting the initial camera position, the initial camera orientation, and the orientation controls of the first waypoint based on the position of each of the first subset of data points.

18. The method of claim 1 further comprising:

differentiating the first subset of data points from other subsets of the first plurality of data points based on the position of each of the first subset of data points producing a concentration of data points that satisfies a threshold and the position of each of the other subsets of data points not producing a concentration of data points that satisfies the threshold;

defining the first subset of data points as a first feature of the plurality of features based on said differentiating; and setting the initial camera position, the initial camera orientation, and the orientation controls of the first waypoint based on the position of each of the first subset of data points.

19. A system comprising:

one or more processors configured to:

obtain a point cloud comprising (i) a first plurality of data points that collectively produce a three-dimensional ("3D") image of an object with a plurality of features, and (ii) a second plurality of data points as one or more waypoints that control viewing of the first plurality of data points, wherein each data point of the first plurality of data points comprises a set of elements with values that define a position of the data point in 3D space of the point cloud and visual characteristics of the data point, and wherein each data point of the second plurality of data points comprises a position in the 3D space of the point cloud for a different initial camera position, an initial camera orientation at the initial camera position that is linked to and centered on a different data point of the first plurality of data points, and orientation controls limiting camera adjustments from the initial camera position and the initial camera orientation;

present a first subset of the plurality of data points in a field-of-view of the camera at the initial camera position and the initial camera orientation of a first waypoint of the one or more waypoints;

change the camera field-of-view from at least one of (i) the initial camera position to a modified camera position within a volume of positions defined by the orientation controls of the first waypoint, or (ii) the initial camera orientation to a modified camera orientation within a range of camera orientations defined by the orientation controls of the first waypoint;

receive input for transitioning from the first waypoint to a second waypoint of the one or more points;

detect a volume between the first waypoint and the second waypoint that does not intersect a data point from the first plurality of data points;

limit camera adjustments within the volume between the first waypoint and the second waypoint according to volume orientation controls that are derived from (i) the orientation controls of the first waypoint defining a first limited set of camera adjustments at the first waypoint, and (ii) the orientation controls of the second waypoint defining a second limited set of camera adjustments at the second waypoint; and present different subsets of the first plurality of data points in the field-of-view of the camera constrained by the volume orientation controls as the camera moves through the volume between the first waypoint and the second waypoint.

* * * * *